US012470960B2

(12) United States Patent
Elshafie et al.

(10) Patent No.: US 12,470,960 B2
(45) Date of Patent: Nov. 11, 2025

(54) CHANNEL INFORMATION BASED ON UNCOMBINED LOG LIKELIHOOD RATIOS (LLRS)

(71) Applicant: QUALCOMM Incorporated, San Diego, CA (US)

(72) Inventors: Ahmed Elshafie, San Diego, CA (US); Gabi Sarkis, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 782 days.

(21) Appl. No.: 17/702,741

(22) Filed: Mar. 23, 2022

(65) Prior Publication Data

US 2022/0312250 A1 Sep. 29, 2022

Related U.S. Application Data

(60) Provisional application No. 63/200,795, filed on Mar. 29, 2021.

(51) Int. Cl.
*H04W 24/10* (2009.01)
*H03M 13/31* (2006.01)

(52) U.S. Cl.
CPC ............ *H04W 24/10* (2013.01); *H03M 13/31* (2013.01)

(58) Field of Classification Search
CPC . H04W 24/10; H04L 1/06; H04L 1/08; H04L 1/0026; H04L 25/067; H04B 7/08; H03M 13/116; H03M 13/6306
See application file for complete search history.

(56) References Cited

U.S. PATENT DOCUMENTS

| 10,708,031 | B1* | 7/2020 | Muralidharan | .... H03M 13/1125 |
| 2004/0229624 | A1* | 11/2004 | Cai | ........ H04L 1/1845 455/449 |
| 2008/0107190 | A1* | 5/2008 | Zhong | ................ H04L 27/2647 375/260 |
| 2010/0062775 | A1* | 3/2010 | Hwang | .................. H04B 7/022 455/442 |
| 2010/0074319 | A1* | 3/2010 | Tseng | .................... H03M 13/31 375/232 |
| 2011/0261868 | A1* | 10/2011 | Bachl | ...................... H04L 1/206 375/224 |
| 2018/0279144 | A1* | 9/2018 | Mukherjee | ............ H04W 24/10 |

FOREIGN PATENT DOCUMENTS

CN 103929279 A * 7/2014

* cited by examiner

*Primary Examiner* — Mohamed A Kamara
(74) *Attorney, Agent, or Firm* — Harrity & Harrity, LLP

(57) ABSTRACT

Wireless communications systems and methods related to wireless communications in a system are provided. A wireless communication device may compute a plurality of log-likelihood ratios (LLRs) based on a received communication signal. At least a first LLR and a second LLR of the plurality of LLRs represent the same first bit in the communication signal. The wireless communication device may combine the first LLR and the second LLR to decode the first bit and transmit a report indicating channel information. The channel information may be based at least in part on the plurality of LLRs before the combining of the first and second LLRs.

30 Claims, 9 Drawing Sheets

CHANNEL INFORMATION BASED ON UNCOMBINED LOG LIKELIHOOD RATIOS (LLRS)

CROSS-REFERENCE TO RELATED APPLICATIONS

The present application claims the benefit of and priority to U.S. Provisional Patent Application No. 63/200,795, filed Mar. 29, 2021, the entirety of which is incorporated by reference herein.

TECHNICAL FIELD

This application relates to wireless communication systems, and more particularly to obtaining channel information based on uncombined log likelihood ratios (LLRs).

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long-term evolution (LTE) technology to a next generation new radio (NR) technology, which may be referred to as $5^{th}$ Generation (5G). For instance, NR is designed to provide a lower latency, a higher bandwidth or a higher throughput, and a higher reliability than LTE. NR is designed to operate over a wide array of spectrum bands, for instance, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

A BS may encode, based on an encoding scheme (e.g., low-density parity-check code (LDPC code)), a data packet including information bits. In some instances, the BS may provide information bits as input into an encoder and obtain a number of encoded bits output by the encoder. The output bits of the encoder include information bits and redundancy bits having an encoder output size. The BS may transmit a communication signal carrying the encoded bits to a UE. A log likelihood ratio (LLR) is indicative of the confidence in zero ("0") or one ("1") being sent for each encoded bit. The UE may compute an LLR for each bit. For a given encoded bit, a positive LLR value may indicate more confidence in "0" being sent for the encoded bit, a negative LLR value may indicate more confidence in "1" being sent for the encoded bit, and an LLR value of zero may indicate equal likelihood of "0" or "1" being sent for the encoded bit. The UE may decode the LLRs to obtain decoded data, which is an estimate of the data sent by the BS.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect of the disclosure, a method of wireless communication performed by a user equipment (UE) includes: computing a plurality of log-likelihood ratios (LLRs) based on a received communication signal, where at least a first LLR and a second LLR of the plurality of LLRs represent the same first bit in the communication signal; combining the first LLR and the second LLR to decode the first bit; and transmitting a report indicating channel information, the channel information being based at least in part on the plurality of LLRs before the combining.

In an additional aspect of the disclosure, an user equipment (UE) includes a memory; and at least one processor operatively coupled to the memory and configured to: compute a plurality of log-likelihood ratios (LLRs) based on a received communication signal, where at least a first LLR and a second LLR of the plurality of LLRs represent the same first bit in the communication signal; combine the first LLR and the second LLR to decode the first bit; and transmit a report indicating channel information, the channel information being based at least in part on the plurality of LLRs before the combining.

In an additional aspect of the disclosure, a non-transitory computer-readable medium (CRM) has program code recorded thereon, the program code including: code for causing a user equipment (UE) to compute a plurality of log-likelihood ratios (LLRs) based on a received communication signal, where at least a first LLR and a second LLR of the plurality of LLRs represent the same first bit in the communication signal; code for causing the UE to combine the first LLR and the second LLR to decode the first bit; and code for causing the UE to transmit a report indicating channel information, where the channel information is based at least in part on the plurality of LLRs before the combining.

In an additional aspect of the disclosure, a user equipment (UE) includes: means for computing a plurality of log-likelihood ratios (LLRs) based on a received communication signal, where at least a first LLR and a second LLR of the plurality of LLRs represent the same first bit in the communication signal; means for combining the first LLR and the second LLR to decode the first bit; and means for transmitting a report indicating channel information, the channel information being based at least in part on the plurality of LLRs before the combining.

Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
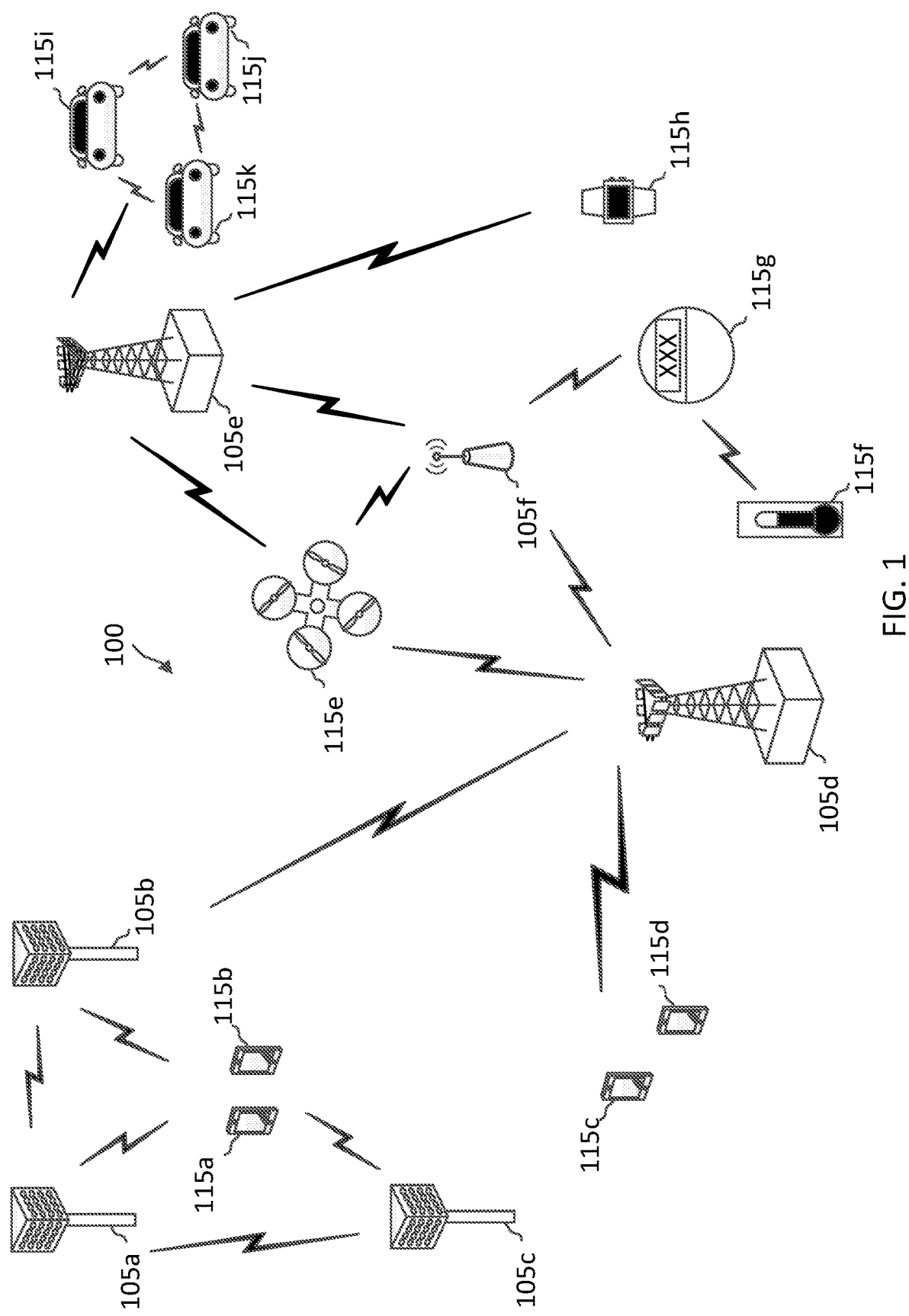
FIG. 1 illustrates a wireless communication network according to one or more aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some aspects, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For instance, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For instance, in various outdoor and macro coverage deployments of less than 3 GHz FDD/TDD implementations, subcarrier spacing may occur with 15 kHz, for instance over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For instance, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink (UL)/downlink (DL) scheduling information, data, and acknowledgement in the same subframe. The self-contained integrated subframe supports communications in unlicensed or contention-based shared spectrum, adaptive UL/DL that may be flexibly configured on a per-cell basis to dynamically switch between UL and DL to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For instance, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For instance, a method may be implemented as part of a system, device, apparatus, and/or as instructions stored on a computer readable medium for execution on a processor or computer. Furthermore, an aspect may comprise at least one element of a claim.

A BS may transmit, via a DL grant, a DL allocation having a number of REs to a UE. The BS may include an encoder and a circular buffer. The circular buffer may have a buffer size of B_size, where B_size is a number greater than one. The BS may store an output of the encoder (e.g., the information bits and the redundancy bits) in the circular buffer. The BS may select L bits from the circular buffer and transmit the selected L bits using the plurality of REs assigned by the DL allocation. The BS may transmit, to the UE and via the DL allocation, the communication signal carrying L bits including the information and redundancy bits.

The UE may receive the communication signal and compute a plurality of log-likelihood ratios (LLRs) based on the received communication signal. The UE may compute an LLR for each bit in the communication signal. The LLRs are indicative of the confidence in zero ("0") or one ("1") being sent for each encoded bit. For a given encoded bit, a positive LLR value may indicate more confidence in "0" being sent for the encoded bit, a negative LLR value may indicate more confidence in "1" being sent for the encoded bit, and an LLR value of zero may indicate equal likelihood of "0" or "1" being sent for the encoded bit. The UE may then decode the LLRs to obtain decoded data, which is an estimate of the data sent by the BS.

In some instances, the number of REs available for transmitting the communication signal can carry a greater number of bits than the number of bits in the buffer size of the encoder at the BS. In such instances, one or more bits in the circular buffer may be transmitted multiple times. When a bit is transmitted multiple times at the BS, the UE can combine LLRs corresponding to the same bit. Combining LLRs can provide a better decoding performance than without LLR combining. Thus, at least some of the LLRs computed from the communication signal may correspond to the same bit in the circular buffer. For a set of LLRs representing the same bit in the communication signal, the UE may combine the set of LLRs to obtain a combined LLR that is decoded to obtain a corresponding output LLR. Accordingly, if the UE determines channel information based on the combined LLR, then the channel information may not be truly reflective of the channel since LLR combining provides an increase in SNR. Using the combined LLR to determine the channel information, the UE may be misled to report a higher SNR than the actual SNR that is provided by the channel. If the UE reports a higher SNR than the actual SNR provided by the channel, the BS may, for example, use a higher modulation order and/or reduce the number of REs in its re-transmissions based on the inaccurate channel information. In doing so, the UE may fail to decode the re-transmission and degrade the system performance.

Additionally or alternatively, the UE may compute a bit error rate (BER) for the received communication signal. The combined LLRs may provide a performance gain since each combined LLR is computed from a combination of signals received from the multiple REs. Thus, channel information or BER estimated from the combined LLRs may lose precision or accuracy at the RE level. As such, the BER from the combined LLRs may be lower than the actual BER that can be supported by the channel. In some instances, the BER can be 0 indicating that there is no error in the transmission from the BS to the UE. When the BER is mapped to an SNR, a zero BER will be mapped to an infinite SNR, which is untrue for the channel. Thus, channel information computed from the combined LLR may not be a good representation of the channel quality.

The present application provides techniques for representing the channel information based on LLRs before LLR combining. To obtain accurate channel information (e.g., accurate SNR), the UE may split the LLRs before combining based on the buffer size of the encoder at the BS. A split LLR or an uncombined LLR may refer to an LLR that has not been combined with another LLR. The channel information may be based on the LLRs before combining the LLRs that represent the same bit in the communication signal. The UE may determine channel information based on these uncombined LLRs. In some instances, UE may transmit the report indicating the channel information before combining the LLRs that represent the same bit in the communication signal.

In some aspects, a wireless communication device (e.g., a UE) may receive a communication signal and compute a plurality of log-likelihood ratios (LLRs) based on the received communication signal. At least a first LLR and a second LLR of the plurality of LLRs may represent the same first bit in the communication signal. The wireless communication device may combine the first LLR and the second LLR to decode the first bit and transmit a report indicating channel information. The channel information may be based at least in part on the plurality of LLRs before the combining of the first and second LLRs.

FIG. 1 illustrates a wireless communication network 100 according to one or more aspects of the present disclosure. The network 100 may be a 5G network. The network 100 includes a number of BSs 105 (individually labeled as 105a, 105b, 105c, 105d, 105e, and 105f) and other network entities. A BS 105 may be a station that communicates with UEs 115 (individually labeled as 115a, 115b, 115c, 115d, 115e, 115f, 115g, 115h, and 115k) and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are instances of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are instances of various machines configured for communication that access the network 100. The UEs 115i-115k are instances of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the DL and/or UL, desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an instance of a gNB or an access node controller (ANC)) may interface with the core network through backhaul links (e.g., NG-C, NG-U, etc.) and may perform radio configuration and scheduling for communication with the UEs 115. In various cases, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-action-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some aspects, the subcarrier spacing between adjacent subcarriers may be fixed, and the total number of subcarriers (K) may be dependent on the system BW. The system BW may also be partitioned into subbands. In other aspects, the subcarrier spacing and/or the duration of TTIs may be scalable.

In some aspects, the BSs 105 can assign or schedule transmission resources (e.g., in the form of time-frequency resource blocks (RB)) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for instance, about 10. Each slot may be further divided into mini-slots or TTIs. In a FDD mode, simultaneous UL and DL transmissions may occur in different frequency bands. For instance, each subframe includes a UL subframe in a UL frequency band and a DL subframe in a DL frequency band. In a TDD mode, UL and DL transmissions occur at different time periods using the same frequency band. For instance, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For instance, each DL or UL subframe may have pre-defined regions for transmissions of reference signals, control information, and data. Reference signals are predetermined signals that facilitate the communications between the BSs 105 and the UEs 115. For instance, a reference signal can have a particular pilot pattern or structure, where pilot tones may span across an operational BW or frequency band, each positioned at a pre-defined time and a pre-defined frequency. For instance, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for DL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some aspects, the BSs 105 may broadcast the PSS, the SSS, and/or the MIB in the form of synchronization signal block (SSBs) and may broadcast the RMSI and/or the OSI over a physical downlink shared channel (PDSCH). The MIB may be transmitted over a physical broadcast channel (PBCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some instances, the random access procedure may be a four-step random access procedure. For instance, the UE 115 may transmit a random access preamble and the BS 105 may respond with a random access response. The random access response (RAR) may include a detected random access preamble identifier (ID) corresponding to the random access preamble, timing advance (TA) information, an UL grant, a temporary cell-radio network temporary identifier (C-RNTI), and/or a backoff indicator. Upon receiving the random access response, the UE 115 may transmit a connection request to the BS 105 and the BS 105 may respond with a connection response. The connection response may indicate a contention resolution. In some instances, the random access preamble, the RAR, the connection request, and the connection response can be referred to as message 1 (MSG1), message 2 (MSG2), message 3 (MSG3), and message 4 (MSG4), respectively. In some instances, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For instance, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In some aspects, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For instance, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using hybrid automatic repeat request (HARQ) techniques to improve communication reliability, for instance, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). After receiving the DL data packet, the UE 115 may transmit a feedback for the DL data packet to the BS 105. In some instances, the UE 115 may transmit the feedback on an acknowledgment resource. The feedback may be an acknowledgement (ACK) indicating that reception of the DL data packet by the UE 115 is successful (e.g., received the DL data without error) or may be a negative-acknowledgement (NACK) indicating that reception of the DL data packet by the UE 115 is unsuccessful (e.g., including an error or failing an error correction). In some aspects, if the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For instance, the BWP pair may include one BWP for UL communications and one BWP for DL communications.

In some aspects, network 100 may be an integrated access backhaul (IAB) network. IAB may refer to a network that uses a part of radio frequency spectrum for backhaul connection of BSs (e.g., BSs 105) instead of optical fibers. The IAB network may employ a multi-hop topology (e.g., a spanning tree) to transport access traffic and backhaul traffic. For instance, one of the BSs 115 may be configured with an optical fiber connection in communication with a core network. The BS 105 may function as an anchoring node (e.g., a root node) to transport backhaul traffic between a core network and other BSs 105 in the IAB network. In some other instances, one BS 105 may serve the role of a central node in conjunction with connections to a core network. And in some arrangements, BSs 105 and the UEs 115 may be referred to as relay nodes in the network.

Figure 2:
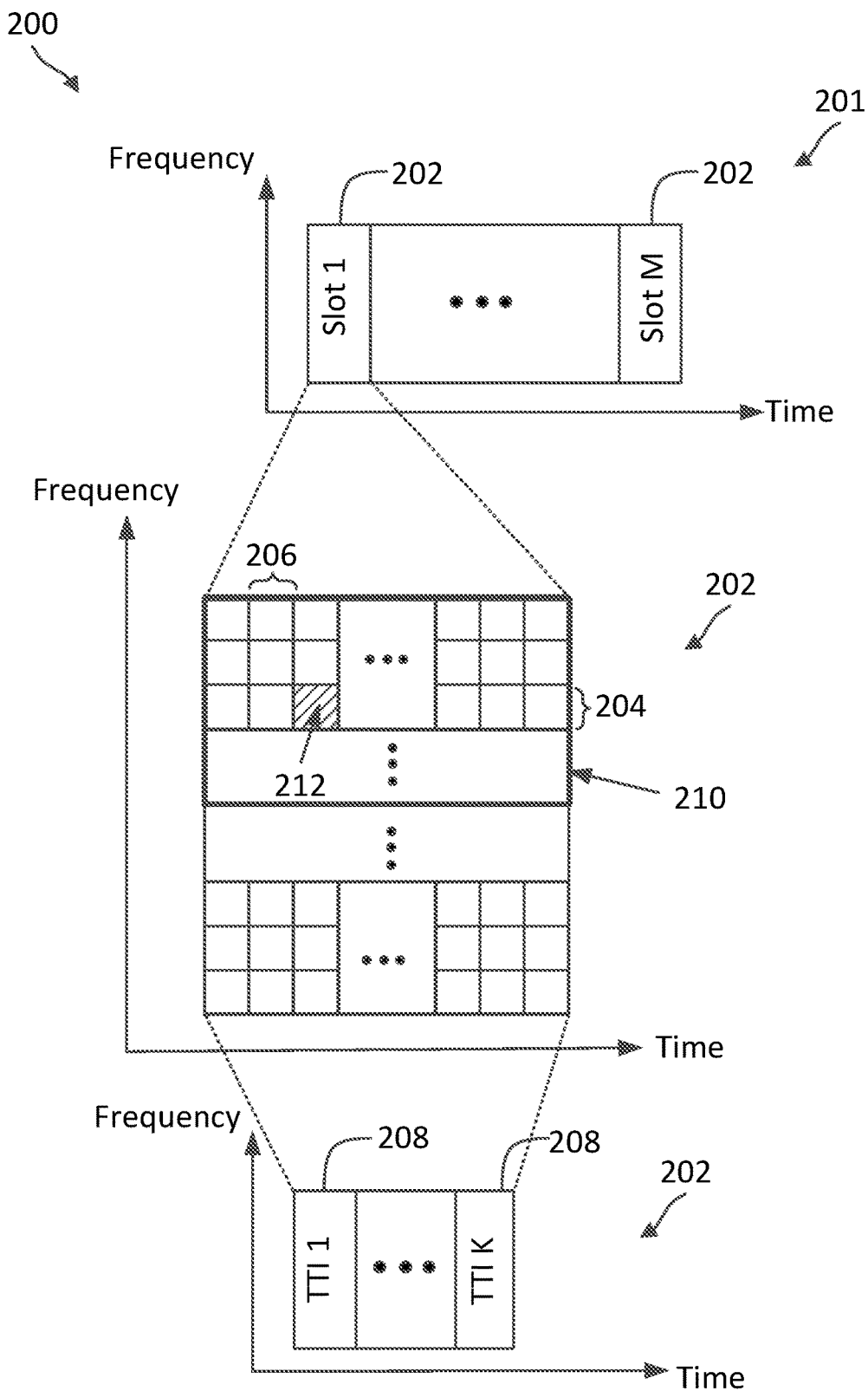
FIG. 2 is a timing diagram illustrating a transmission frame structure according to one or more aspects of the present disclosure.

FIG. 2 is a timing diagram illustrating a radio frame structure 200 according to one or more aspects of the present disclosure. The radio frame structure 200 may be employed by BSs such as the BSs 105 and UEs such as the UEs 115 in a network such as the network 100 for communications. In particular, the BS may communicate with the UE using time-frequency resources configured as shown in the radio frame structure 200. In FIG. 2, the x-axes represent time in some arbitrary units, and the y-axes represent frequency in some arbitrary units. The transmission frame structure 200 includes a radio frame 201. The duration of the radio frame 201 may vary depending on the aspects. For instance, the radio frame 201 may have a duration of about ten milliseconds. The radio frame 201 includes M number of slots 202, where M may be any suitable positive integer. For instance, M may be about 10.

Each slot 202 includes a number of subcarriers 204 in frequency and a number of symbols 206 in time. The number of subcarriers 204 and/or the number of symbols 206 in a slot 202 may vary depending on the aspects, for instance, based on the channel bandwidth, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In an aspect, a BS (e.g., BS 105 in FIG. 1) may schedule a UE (e.g., UE 115 in FIG. 1) for UL and/or DL communications at a time-granularity of slots 202 or less than a slot 202. For instance, the BS 105 may schedule the UE 115 in units of TTIs 208. Each slot 202 may be time-partitioned into K number of TTIs 208. Each TTI 208 may include one or more symbols 206. A TTI 208 in a slot 202 may have variable lengths. For instance, when a slot 202 includes N number of symbols 206, a TTI 208 may have a length between one symbol 206 and (N−1) symbols 206. In some aspects, a TTI 208 may have a length of about two symbols 206, about four symbols 206, or about seven symbols 206. In some instances, the BS may schedule UE 115 at a frequency-granularity of an RB 210 (e.g., including about 12 subcarriers 204).

Figure 3:
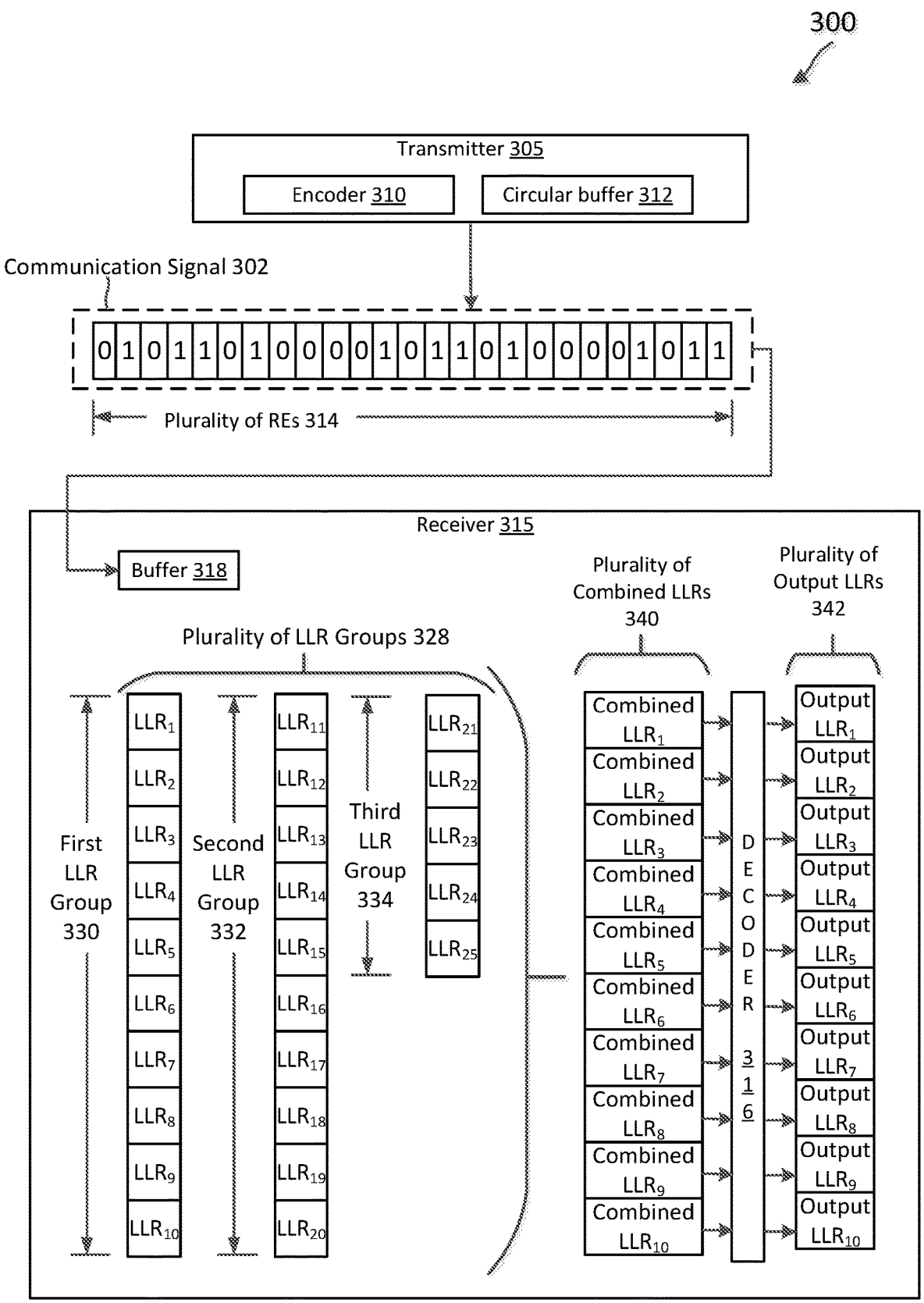
FIG. 3 illustrates a block diagram of a transmitter that transmits a communication signal to a receiver according to one or more aspects of the present disclosure.

FIG. 3 illustrates a block diagram 300 of a transmitter 305 transmitting a communication signal 302 to a receiver 315 according to one or more aspects of the present disclosure. The transmitter 305 may be, for example, a BS 105 that transmits the communication signal 302 to the receiver 315. The receiver 315 may be, for example, a UE 115 that receives the communication signal 302 from the transmitter 305.

The transmitter 305 may transmit, via a DL grant, a DL allocation having a number of REs to the UE 115. The transmitter 305 may include an encoder 310 and a circular buffer 312. In general, the encoder 310 may implement any coding scheme, which may include a Turbo code, a convolutional code, a low density parity check (LDPC) code, a cyclic redundancy check (CRC) code, a block code, etc., or a combination thereof. The encoder 310 may generate and append a CRC value to a data block, which may be used by the receiver 315 to determine whether the data block was decoded correctly or in error. Turbo code, convolutional code, and LDPC code are different forward error correction (FEC) codes that allow receiver 315 to correct errors caused by impairments in the wireless channel.

The circular buffer 312 may have a buffer size of B_size, where B_size is a number greater than one. The buffer size may be a function of, for instance, the limit buffer rate matching (LBRM) and/or low-density parity-check (LDPC) base graph. If the LBRM is disabled, the buffer size may be equal to S, where S is equal to (66*Z) for base graph 1 and 50*Z for base graph 2, and where Z is the lifting size (see 3GPP TS 38.212, clause 5.2.2 for Z).

The transmitter 305 may encode, based on an encoding scheme (e.g., low-density parity-check code (LDPC code)), a data packet including information bits. In some instances, the transmitter 305 may provide information bits as input into the encoder 310 and obtain a number of encoded bits output by the encoder 310. The output bits of the encoder 310 include information bits and redundancy bits having an encoder output size.

In the present disclosure, information bits may also be referred to as systematic bits. The transmitter 305 may store an output of the encoder 310 (e.g., the information bits and the redundancy bits) in a circular buffer 312. The bits in the circular buffers may provide different redundancy versions (RVs) for HARQ processing. In some instances, different RVs may include a set of bits with a different starting position within the circular buffer. Based on the number of REs available in the DL allocation and the modulation coding scheme (MCS) assigned by the DL allocation, the transmitter 305 may calculate L, where L is a positive number that represents the number of bits that can be carried on the plurality of REs 314 assigned by the DL allocation. The transmitter 305 may select L bits (e.g., at least some information and/or some redundancy bits) from the circular buffer 312 based on a desired RV and transmit the selected L bits using the plurality of REs 314 assigned by the DL allocation. The transmitter 305 may transmit, to the receiver 315 and via the DL allocation, the communication signal 302 carrying L bits including the information and redundancy bits.

In some instances, the transmitter 305 may transmit the communication signal 302 carrying L bits for modulation on a frequency subcarrier. The communication signal 30 may include L bits ("0101101000010110100001011") carried on a plurality of REs 314, where L=25, for example. The REs 314 may be similar to the REs 212 and may occupy one or more symbols in time and one or more subcarriers in frequency. In some instances, if the buffer size of the circular buffer 312 is B_size=10, the plurality of REs 314 includes twenty-five REs, each RE carries 1 bit, for example, for a binary phase shift keying (BPSK) modulation, and the communication signal 302 includes twenty-five bits, then the communication signal 302 includes (L=2.5*B_size) bits. In general, the number of bits carried by the communication signal 302 may be a product of the number of REs and a number of bits per RE, which is dependent on the modulation scheme.

The receiver 315 includes a decoder 316 and a buffer 318. The receiver 315 may receive, from the transmitter 305, the communication signal 302 from the plurality of REs 314. The communication signal 302 may include an input signal carrying L bits including the information and redundancy bits, and the receiver 315 may store the L bits in the buffer 318. The receiver 315 may compute a plurality of log-likelihood ratios (LLRs) based on the received communication signal 302. The plurality of LLRs may include $LLRs_{1-25}$. The receiver 315 may compute one or more LLRs from each RE. For the given example, each RE carries one bit, and thus the receiver 315 may compute one LLR for each RE.

The receiver 315 may then compute LLRs for the bits based on the received communication signal 302. The LLRs are indicative of the confidence in zero ("0") or one ("1") being sent for each encoded bit. For a given encoded bit, a positive LLR value may indicate more confidence in "0" being sent for the encoded bit, a negative LLR value may indicate more confidence in "1" being sent for the encoded bit, and an LLR value of zero may indicate equal likelihood of "0" or "1" being sent for the encoded bit. The receiver 315 may then decode the LLRs to obtain decoded data, which is an estimate of the data sent by the transmitter 305.

As discussed, the receiver 315 may compute an LLR for each bit of the L bits in the communication signal 302. In some instances, the receiver 315 may calculate a plurality of LLR groups 328 based on the received communication signal 302. For instance, the receiver 315 may compute the LLRs and split the LLRs into a plurality of LLR groups 328 based on the buffer size B_size of the circular buffer 312 at the transmitter 305. In the illustrated example, L=25 and B_size is 10, thus the receiver 315 can split the LLRs into three LLR groups before combining them for input into the decoder 316. The plurality of LLR groups 328 may include a first LLR group 330, a second LLR group 332, and a third LLR group 334. The first LLR group 330, the second LLR group 332, and the third LLR group 334 may also be referred to as uncombined LLRs. The receiver 315 may use each of the first LLR group 330, the second LLR group 332, and the third LLR group 334 for evaluating the signal-to-interference-plus-noise ratio (SINR) prior to combining the LLRs.

The plurality of LLR groups 328 may include a first number of LLR groups, where the first number is or includes a result of a ceiling operation applied to a quotient of L and an encoder buffer size of the encoder 310 at the transmitter 305, and L represents the number of bits included in the communication signal 302. The calculation of the first number of LLR groups may be represented by the equation (1) below:

First number of LLR groups=$\lceil L/B\_size \rceil$,   (equation 1)

, where L=number of bits in the communication signal, and B_size=encoder buffer size of the encoder at the transmitter.

In keeping with the above scenario in which L=25 and the encoder buffer size=10, the quotient of L and the encoder buffer size is 2.5 (e.g., 25/10), and the first number is 3 (e.g., ceiling operation of 2.5 is 3). Accordingly, the plurality of LLR groups 328 may include three LLR groups.

Additionally or alternatively, a second number of LLR groups of the plurality of LLR groups 328 includes the same number of LLRs as the encoder buffer size of the encoder 310 at the transmitter 305, where the second number is or includes a result of a floor operation applied to the quotient. The calculation of the second number of LLR groups may be represented by the equation (2) below:

Second number of LLR groups=$\lfloor L/B\_size \rfloor$,   (equation 2)

, where L=number of bits in the communication signal, and B_size=encoder buffer size of the encoder at the transmitter.

In keeping with the above scenario in which L=25 and the encoder buffer size=10, and the second number is 2 (e.g., floor operation of 2.5 is 2). Accordingly, two LLR groups include 10 LLRs. Each LLR group of the second number of LLR groups includes a group of LLRs corresponding to consecutive bits of the L bits included in the communication signal. Each LLR group of the plurality of LLR groups 328 includes at least one LLR of the plurality of LLRs representing the same bit in the communication signal 302.

In some instances, if the quotient of L and the encoder buffer size of the encoder 310 at the transmitter 305 has a remainder, then one LLR group of the plurality of LLR groups includes fewer LLRs than the encoder buffer size. In FIG. 3, the quotient is 2.5 and accordingly has a remainder. Each of the first and second LLR groups 330 and 332 includes ten LLRs, and the third LLR group 334 includes five LLRs, which is fewer than ten LLRs. In some instances, if the quotient does not have a remainder, then the second number of LLR groups is equal to the quotient. In some examples, an LLR group may be represented by a vector.

The first LLR group 330 has a length of ten and includes an $LLR_1$ corresponding to the first bit "0" carried in a first RE in the plurality of REs 314, an $LLR_2$ corresponding to the second bit "1" carried in a second RE in the plurality of REs 314, an $LLR_3$ corresponding to the third bit "0" carried in a third RE in the plurality of REs 314, an $LLR_4$ corresponding to the fourth bit "1" carried a fourth RE in in the plurality of REs 314, an $LLR_5$ corresponding to the fifth bit "1" carried in a fifth RE in the plurality of REs 314, an $LLR_6$ corresponding to the sixth bit "0" carried in a sixth RE in the plurality of REs 314, an $LLR_7$ corresponding to the seventh bit "1" carried in a seventh RE in the plurality of REs 314, an $LLR_8$ corresponding to the eighth bit "0" carried in an eighth RE in the plurality of REs 314, an $LLR_9$ corresponding to the ninth bit "0" carried in a ninth RE in the plurality of REs 314, and an $LLR_{10}$ corresponding to the tenth bit "0" carried in a tenth RE in the plurality of REs 314. An LLR may correspond to a bit if the receiver 315 computes the LLR for the bit.

The receiver 315 may compute the $LLR_1$ for the first bit "0" carried in the plurality of REs 314, compute the $LLR_2$ for the second bit "1" carried in the plurality of REs 314, compute the $LLR_3$ for the third bit "0" carried in the plurality of REs 314, compute the $LLR_4$ for the fourth bit "1" carried in the plurality of REs 314, compute the $LLR_5$ for the fifth bit "1" carried in the plurality of REs 314, compute the $LLR_6$ for the sixth bit "0" carried in the plurality of REs 314, compute the $LLR_7$ for the seventh bit "1" carried in the plurality of REs 314, compute the $LLR_8$ for the eighth bit "0" carried in the plurality of REs 314, compute the $LLR_9$ for the ninth bit "0" carried in the plurality of REs 314, and compute the $LLR_{10}$ for the tenth bit "0" carried in the plurality of REs 314 in the communication signal 302.

The second LLR group 332 has a length of ten and includes an $LLR_{11}$ corresponding to the first bit "0" carried in the first RE in the plurality of REs 314, an $LLR_{12}$ corresponding to the second bit "1" carried in the second RE in the plurality of REs 314, an $LLR_{13}$ corresponding to the third bit "0" carried in the third RE in the plurality of REs 314, an $LLR_{14}$ corresponding to the fourth bit "1" carried in the fourth RE in the plurality of REs 314, an $LLR_{15}$ corresponding to the fifth bit "1" carried in the fifth RE in the plurality of REs 314, an $LLR_{16}$ corresponding to the sixth bit "0" carried in the sixth RE in the plurality of REs 314, an $LLR_{17}$ corresponding to the seventh bit "1" carried in the seventh RE in the plurality of REs 314, an $LLR_{18}$ corresponding to the eighth bit "0" carried in the eighth RE in the plurality of REs 314, an $LLR_{19}$ corresponding to the ninth bit "0" carried in the ninth RE in the plurality of REs 314, and an $LLR_{20}$ corresponding to the tenth bit "0" carried in the tenth RE in the plurality of REs 314.

The receiver 315 may compute the $LLR_{11}$ for the first bit "0" carried in the plurality of REs 314, compute the $LLR_{12}$ for the second bit "1" carried in the plurality of REs 314, compute the $LLR_{13}$ for the third bit "0" carried in the plurality of REs 314, compute the $LLR_{14}$ for the fourth bit "1" carried in the plurality of REs 314, compute the $LLR_{15}$ for the fifth bit "1" carried in the plurality of REs 314, compute the $LLR_{16}$ for the sixth bit "0" carried in the plurality of REs 314, compute the $LLR_{17}$ for the seventh bit "1" carried in the plurality of REs 314, compute the $LLR_{18}$ for the eighth bit "0" carried in the plurality of REs 314, compute the $LLR_{19}$ for the ninth bit "0" carried in the plurality of REs 314, and compute the $LLR_{20}$ for the tenth bit "0" carried in the plurality of REs 314 in the communication signal 302.

The third LLR group 334 has a length of five and includes an $LLR_{21}$ corresponding to the first bit "0" carried in the first RE in the plurality of REs 314, an $LLR_{22}$ corresponding to the second bit "1" carried in the second RE in the plurality of REs 314, an $LLR_{23}$ corresponding to the third bit "0" carried in the third RE in the plurality of REs 314, an $LLR_{24}$ corresponding to the fourth bit "1" carried in the fourth RE in the plurality of REs 314, and an $LLR_{25}$ corresponding to the fifth bit "1" carried in the fifth RE in the plurality of REs 314. The receiver 315 may compute the $LLR_{21}$ for the first bit "0" carried in the plurality of REs 314, compute the $LLR_{22}$ for the second bit "1" carried in the plurality of REs 314, compute the $LLR_{23}$ for the third bit "0" carried in the plurality of REs 314, compute the $LLR_{24}$ for the fourth bit "1" carried in the plurality of REs 314, and compute the $LLR_{25}$ for the fifth bit "1" carried in the plurality of REs 314 in the communication signal 302.

The $LLR_1$ in the first LLR group 330, the $LLR_{11}$ in the second LLR group 332, and the $LLR_{21}$ in the third LLR group 334 represent the same first bit "0" carried in the first RE in the plurality of REs 314; the $LLR_2$ in the first LLR group 330, the $LLR_{12}$ in the second LLR group 332, and the $LLR_{22}$ in the third LLR group 334 represent the same second bit "1" carried in the second RE in the plurality of REs 314; the $LLR_3$ in the first LLR group 330, the $LLR_{13}$ in the second LLR group 332, and the $LLR_{23}$ in the third LLR group 334 represent the same third bit "0" carried in the second RE in the plurality of REs 314; and so on.

The receiver 315 may transmit a report indicating channel information. The channel information may be, for example, a measurement of a signal-to-noise ratio (SNR) of the channel. The channel information may be based at least in part on the plurality of LLRs included in the first LLR group 330, the second LLR group 332, and/or the third LLR group 334.

In some instances, the number of REs available for transmitting the communication signal 302 can carry a number of bits that is less than or equal to the buffer size of the encoder 310 at the transmitter 305. If the number of bits carried in the communication signal 302 (e.g., L bits) is less than or equal to the buffer size of the encoder 310 at the transmitter 305 and the receiver 315 computes an LLR for each bit in the communication signal, then each LLR may correspond to a different bit in the circular buffer 312. That is, there is no more than one LRR corresponding to a bit in the circular buffer 312. Accordingly, it may be unnecessary for the receiver 315 to combine any of the LLRs. The receiver 315 may input the computed LLRs into the decoder 316 and obtain three corresponding output LLRs.

In some instances, the number of REs available for transmitting the communication signal 302 can carry a greater number of bits than the number of bits in the buffer size of the encoder 310 at the transmitter 305. In such instances, one or more bits in the circular buffer 312 may be transmitted multiple times. When a bit is transmitted multiple times at the transmitter 305, the receiver 315 can combine LLRs corresponding to the same bit. Combining LLRs can provide a better decoding performance than without LLR combining. If the number of REs available for transmitting the communication signal 302 can carry a greater number of bits than the number of bits in the buffer size of the encoder 310 at the transmitter 305, then the transmitter 305 may transmit one or more bits from the circular buffer 312 multiple times. Thus, the LLRs computed from the communication signal 302 may correspond to the same bit in the circular buffer 312. Accordingly, for the set of LLRs representing the same bit in the communication signal 302, the receiver 315 may combine the set of LLRs to obtain a combined LLR that is decoded in the decoder 316 to obtain a corresponding output LLR. Accordingly, if the receiver 315 determines channel information based on the combined LLR, then the channel information may not be truly reflective of the channel since LLR combining provides an increase in SNR. Using the combined LLR to determine the channel information, the receiver 315 may be misled to report a higher SNR than the actual SNR that is provided by the channel. If the receiver 315 reports a higher SNR than the actual SNR provided by the channel, the transmitter 305 may, for example, use a higher modulation order and/or reduce the number of REs in its re-transmissions based on the inaccurate channel information. In doing so, the receiver 315 may fail to decode the re-transmission and degrade the system performance.

In some instances, the receiver 315 may compute a bit error rate (BER) for the communication signal 302. For instance, the receiver 315 may apply a hard decision to each combined LLR, apply a hard decision to each output LLR, and determine the BER based on a difference between the binary values from the combined LLRs and the binary values from the output LLRs. As explained above, the combined LLRs may provide a performance gain since each combined LLR is computed from a combination of signals received from the multiple REs 314. Thus, channel information or BER estimated from the combined LLRs may lose precision or accuracy at the RE level. As such, the BER from the combined LLRs may be lower than the actual BER that can be supported by the channel. In some instances, the BER can be 0 indicating that there is no error in the transmission from the transmitter 305 to the receiver 315. When the BER is mapped to an SNR, a zero BER will be mapped to an infinite SNR, which is untrue for the channel. Thus, channel information computed from the combined LLR may not be a good representation of the channel quality.

The present application provides techniques for representing the channel information based on LLRs before LLR combining. To obtain accurate channel information (e.g., accurate SNR), the receiver 315 may split the LLRs of the plurality of LLR groups 328 based on the buffer size of the encoder 310 at the transmitter 305. A split LLR or an uncombined LLR may refer to an LLR that has not been combined with another LLR. In some instances, the receiver 315 may split the plurality of LLR groups 328 into three LLR groups including the first LLR group 330, the second LLR group 332, and the third LLR group 334, as will be further discussed below. The channel information may be based on the LLRs before combining the LLRs that represent the same bit in the communication signal 302. The receiver 315 may determine channel information based on these uncombined LLRs. In some instances, the receiver 315 may transmit the report indicating the channel information before combining the LLRs that represent the same bit in the communication signal 302.

The receiver 315 may combine LLRs of the plurality of LLR groups 328 to obtain the plurality of combined LLRs 340 and a plurality of output LLRs 342. The receiver 315 may combine the LLRs that represent the same bit in the communication signal 302 to decode the combined bit into the decoder 316. In some instances, for each LLR of the plurality of LLRs representing the same bit in the communication signal 302, the receiver 315 may combine the respective LLRs to obtain a combined LLR and decode the combined LLR to obtain a corresponding output LLR. Each combined LLR may be decoded using the decoder 316 to obtain a corresponding output LLR. The $LLR_1$ from the first LLR group 330, the $LLR_{11}$ from the second LLR group 332, and the $LLR_{21}$ from the third LLR group 334 represent the same first bit "0" carried in the first RE in the plurality of REs 314. The receiver 315 may combine the $LLR_1$, the $LLR_{11}$, and the $LLR_{21}$ to obtain a combined $LLR_1$ and may decode the combined $LLR_1$ to obtain a corresponding output $LLR_1$. The receiver 315 may perform similar actions on LLRs of the plurality of LLR groups 328 to obtain the remaining combined LLRs of the plurality of the combined LLRs 340 and the remaining output LLRs of the plurality of the output LLRs 342.

Figure 4:
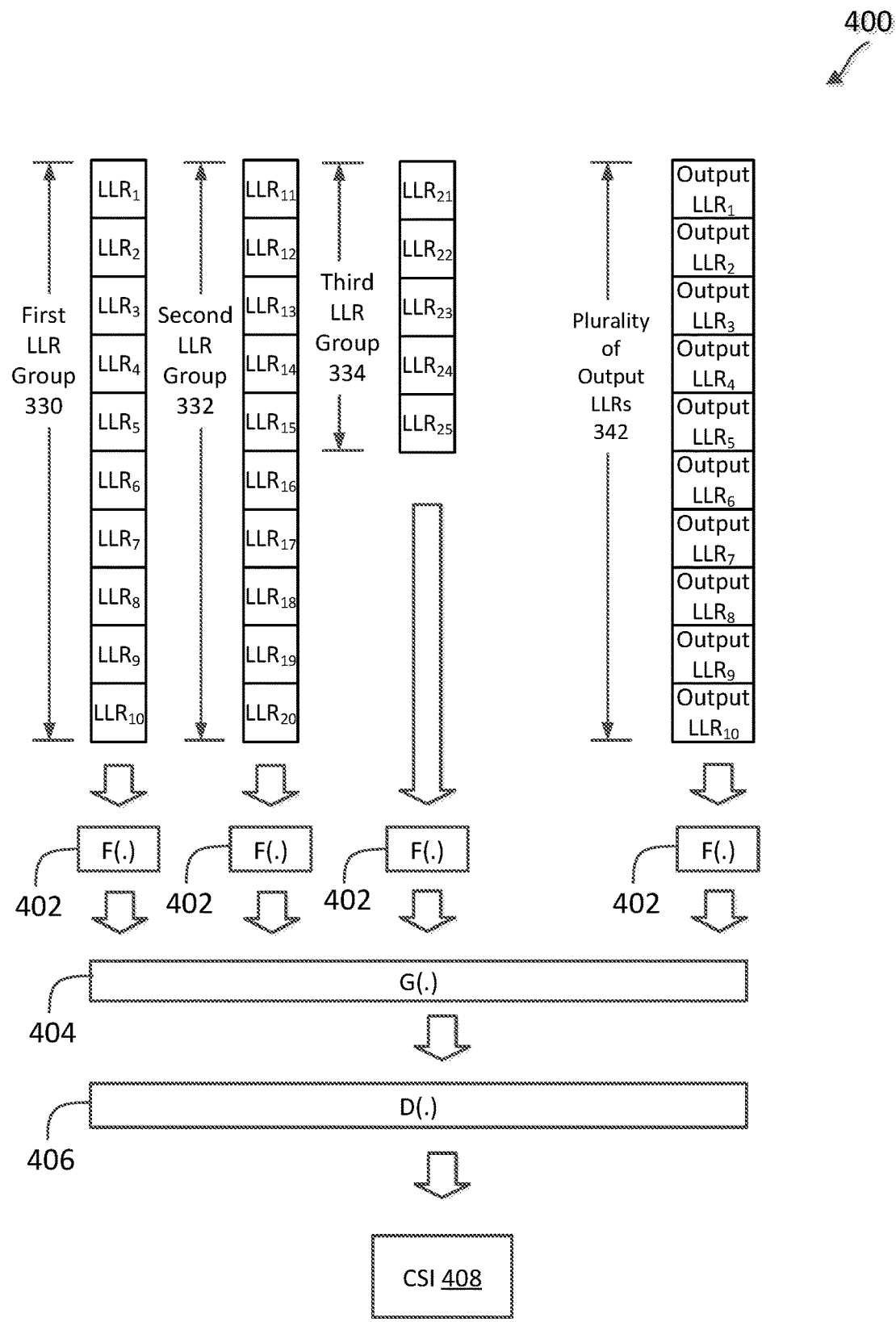
FIG. 4 illustrates a block diagram including three functions for mapping log likelihood ratios (LLRs) to channel state information (CSI) according to one or more aspects of the present disclosure.

FIG. 4 illustrates a block diagram 400 including three functions for mapping LLRs to a CSI according to one or more aspects of the present disclosure. The first LLR group 330, the second LLR group 332, the third LLR group 334, and the plurality of output LLRs 342 are discussed above in relation to FIG. 3. The UE 115 or receiver 315 may apply one or more functions for mapping LLRs to a CSI. The receiver 315 may apply one or more functions on the uncombined LLRs (e.g., $LLR_{1-25}$), the combined LLRs (e.g., combined $LLR_{1-10}$), and/or the output LLRs (e.g., output $LLR_{1-10}$). The transmitter 305 may define one or more functions (e.g., a first function, a second function, a third function, etc.) and report the one or more functions to the receiver 315. The transmitter 305 may report the one or more functions using, for instance, RRC or MAC-CE. Additionally or alternatively, the transmitter 305 may combine one or more of the functions for the receiver 315 to apply on one or more LLRs.

The receiver 315 may apply a first function F(.) 402, a second function G(.) 404, and/or a third function D(.) 406 to compute a CSI 408 based on the combined LLRs and transmit the CSI 408 to the transmitter 305. Such channel information may provide the transmitter 305 with an indication of the quality of combining across currently allocated RBs. The receiver 315 may report one SNR for each combined LLR.

In some instances, the receiver 315 may apply the first function F(.) 402 on each LLR group of the plurality of LLR groups 328 and on the plurality of output LLRs 342. For instance, for each LLR group of the plurality of LLR groups, the receiver 315 may apply a first function F(.) 402 to each LLR in the respective LLR group. The receiver 315 may apply the first function F(.) 402 to the first LLR group 330, to the second LLR group 332, and to the third LLR group 334. The receiver 315 may also apply the first function F(.) 402 to each output LLR of the plurality of output LLRs 342 corresponding to the respective LLR.

For each LLR group of the plurality of LLR groups, the receiver 315 may apply the first function F(.) 402 to each LLR in the respective LLR group to obtain one or more first binary values and may apply the first function F(.) 402 to each output LLR corresponding to the respective LLR to obtain one or more second binary values. The receiver 315 may apply the first function F(.) 402 on the first LLR group 330 of the plurality of LLR groups 328, apply the first function F(.) 402 on the second LLR group 332 of the plurality of LLR groups 328, apply the first function F(.) 402 on the third LLR group 334 of the plurality of LLR groups 328, and/or apply the first function F(.) 402 on the plurality of output LLRs 342.

In some instances, applying the first function F(.) 402 may include applying a hard decision to each LLR in each LLR group 330, 332, and 334. For instance, the first function F(.) 402 may be a hard decision, which may be similar to a soft quantization, e.g., for an LLR value, if the LLR value is <Q, then the bit value is 1; else the bit value is 0. The receiver 315 may use the first function F(.) 402 to map one or more LLRs from being a decimal value to a binary value (0 or 1). For instance, the receiver 315 may apply the first function F(.) 402 on the $LLR_1$ from the first LLR group 330 to map the $LLR_1$ to a binary value of 0 or 1. The receiver 315 may apply the first function F(.) 402 to each LLR in the first LLR group 330, the second LLR group 332, and the third LLR group 334 to obtain one or more first binary values. In some instances, the receiver 315 combines LLRs of the plurality of LLRs representing the same bit to decode the bit, where the bit is the hard decision of the combined LLR.

The receiver 315 may apply a second function G(.) 404 to each LLR group of the plurality of LLR groups 328 and the corresponding plurality of output LLRs 342. An output of the first function F(.) 402 may be used as an input into the second function G(.) 404. For instance, the receiver 315 may apply the second function G(.) 404 to the one or more first binary values and the one or more second binary value to obtain a metric. The second function G(.) 404 may include, for instance, an XOR operation (modulo 2 operation) or an absolute value operation. For instance, the second function G(.) 404 may compute an absolute value for each LLR in each LLR group of the plurality of LLR groups 328. The transmitter 305 may include a machine learning module that uses the LLR(s) as input and predicts a suitable MCS based on the input. The receiver 315 may indicate the MCS in the channel indication report to the transmitter 305.

An output of the second function G(.) 404 may provide an indication of the BER. For each LLR group of the plurality of LLR groups 328, the receiver 315 may compare the one or more first binary values associated with the respective LLR group with the one or more second binary values associated with the output LLR corresponding to the respective LLR group to obtain a metric. For instance, the receiver 315 may apply the XOR operation and accordingly compare each bit in the first LLR group 330 with each corresponding bit in the corresponding output LLR (e.g., compare $LLR_1$ with output $LLR_1$, compare $LLR_2$ with output $LLR_2$, ... and compare $LLR_{10}$ with output $LLR_{10}$) to obtain a first metric, may compare each bit in the second LLR group 332 with each corresponding bit in the corresponding output LLR (e.g., compare $LLR_{11}$ with output $LLR_1$, compare $LLR_{12}$ with output $LLR_2$, ... and compare $LLR_{20}$ with output $LLR_{10}$) to obtain a second metric, and compare each bit in the third LLR group 334 with each corresponding bit in the corresponding output LLR (e.g., compare $LLR_{21}$ with output $LLR_{21}$, compare $LLR_{22}$ with output $LLR_2$, ... and compare $LLR_{25}$ with output $LLR_5$) to obtain a third metric.

In some instances, the receiver 315 may apply the second function G(.) 404 to one or more outputs of the first function F(.) 402 using equation (3) below:

$$R\_i = G(F(X\_i), F(Y\_i)), \quad \text{equation (3)}$$

, where R_i represents an output of the second function G(.) 404 for an LLR group, G represents the second function G(.) 404, F represents the first function F(.) 402, i=1, 2, 3, ..., N_t+1, and N_t represents the number of LLRs in an LLR group having a buffer size equal to the buffer size of the encoder at the transmitter, and where X_i is mapped to an LLR group i (e.g., X_1 is mapped to a first LLR group of the plurality of LLR groups 328 or to LLR group 330, X_2 is mapped to a second LLR group of the plurality of LLR groups 328 or LLR group 332, and X_3 is mapped to a third LLR group of the of the plurality of LLR groups 328 or to LLR group 334), and where Y_i represents the decoded output with the combined LLR input.

In some instances, the receiver 315 may apply a third function D(.) 406 to a result of the second function G(.) 404. The receiver 315 may use the third function D(.) 406 to map the result of the second function G(.) 404 to channel information (e.g., CSI 408). For instance, for each LLR group of the plurality of LLR group 328, the receiver 315 may apply the third function D(.) 406 to map the respective metric to the CSI 408. The third function D(.) 406 may include a BER-to-SINR mapping. The SINR may be mapped to channel quality information (CQI) for a given target block error rate (BLER). In some instances, the third function D(.) 406 may include a BER-to-SINR mapping using the conventional BER computations for a given M-Quadrature Amplitude Modulation (QAM), where M is the number of constellation points. The number of transmitted bits per QAM point may be computed using equation (4) below.

$$Qm = \text{Log } 2(M), \quad \text{equation (4)}$$

, where Qm represents the number of transmitted bits per QAM point, and M is the number of constellation points.

In some instances, the receiver 315 may apply the third function D(.) 406 to one or more outputs of the second function G(.) 404 using equation (5) below.

$$D(R\_1, \ldots, R\_\{N\_t+1\}) = \text{sum}\_i(\text{BER-to-SINR for } R\_i)/(N\_t+1), \quad \text{equation (4)}$$

, where D represents the third function D(.) 406, R_i represents an output of the second function G(.) 404 for an LLR group, i=1, 2, 3, ..., N_t+1, and N_t represents the number of LLRs in an LLR group having a buffer size equal to the buffer size of the encoder at the transmitter.

In some instances, the receiver 315 may map an output of the third function D(.) 406 to a CQI based on linkcurve tables for a given target BLER using the third function D(.) 406. A linkcurve table may provide a mapping between CQIs and SNRs for a given target BLER. The transmitter 305 may share the linkcurve table through, for example, RRC or MAC-CE. The receiver 315 may map an output of the third function D(.) 406 into a BER, map the BER into SINR, and then map the SINR to obtain a MCS for a given target layer using the linkcurve table.

The above scenarios provide examples of the first, second, and third functions. Although FIG. 4 illustrates three functions that are used to map the LLRs to channel information, it should be understood that the receiver 315 may apply fewer than or more than three functions to each of the uncombined LLRs, combined LLRs, and/or output LLRs.

The receiver 315 may report channel information to the transmitter 305. The receiver 315 may report, in a HARQ-ACK feedback resource in PUCCH to the transmitter 305, a CSI.

Figure 5:
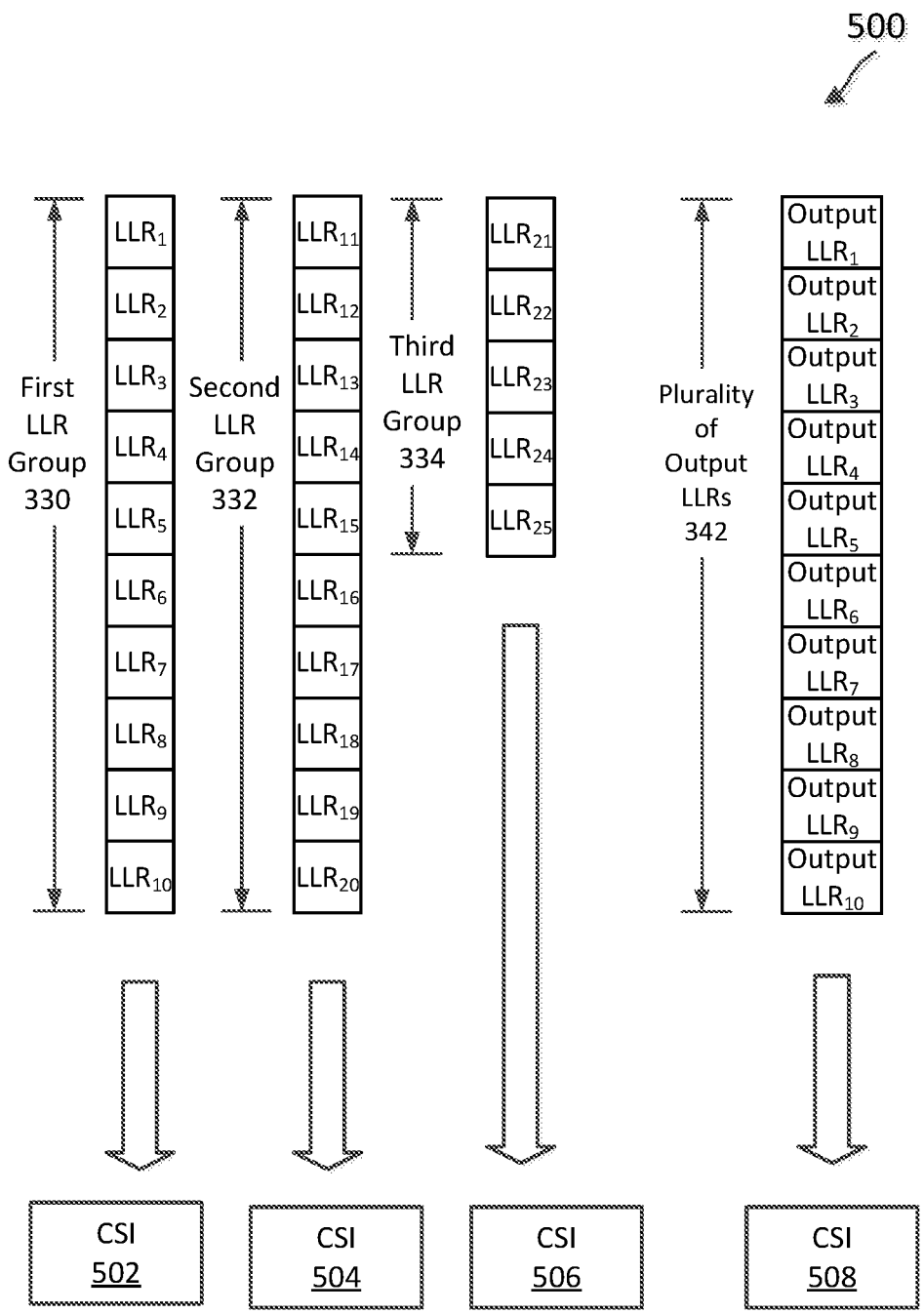
FIG. 5 illustrates a block diagram for reporting channel information according to one or more aspects of the present disclosure.

FIG. 5 illustrates a block diagram 500 for reporting channel information according to one or more aspects of the present disclosure. The first LLR group 330, the second LLR group 332, the third LLR group 334, and the plurality of output LLRs 342 are discussed above in relation to FIG. 3. In FIG. 5, the receiver 315 may compute a CSI for each LLR group (e.g., LLR groups 330, 332, and 334) of the plurality of LLR groups 328. For instance, the receiver 315 may compute a CSI 502 for the first LLR group 330, compute a CSI 504 for the second LLR group 332, and compute a CSI 506 for the third LLR group 332. In this instance, the receiver 315 computes three CSI, one for each LLR group. The receiver 315 may also compute a CSI 508 for the plurality of output LLRs 342. The receiver 315 may transmit a reporting indicating the CSI 502 for the first LLR group 330, the CSI 504 for the second LLR group 333, the CSI 506 for the third LLR group 334, and/or the CSI 508 for the plurality of output LLRs 342. In some instances, the CSI may include SNR. For instance, the receiver 315 may compute one SNR per LLR group and may compute one SNR for the plurality of output LLRs 342, thus computing four SNRs.

Figure 6:
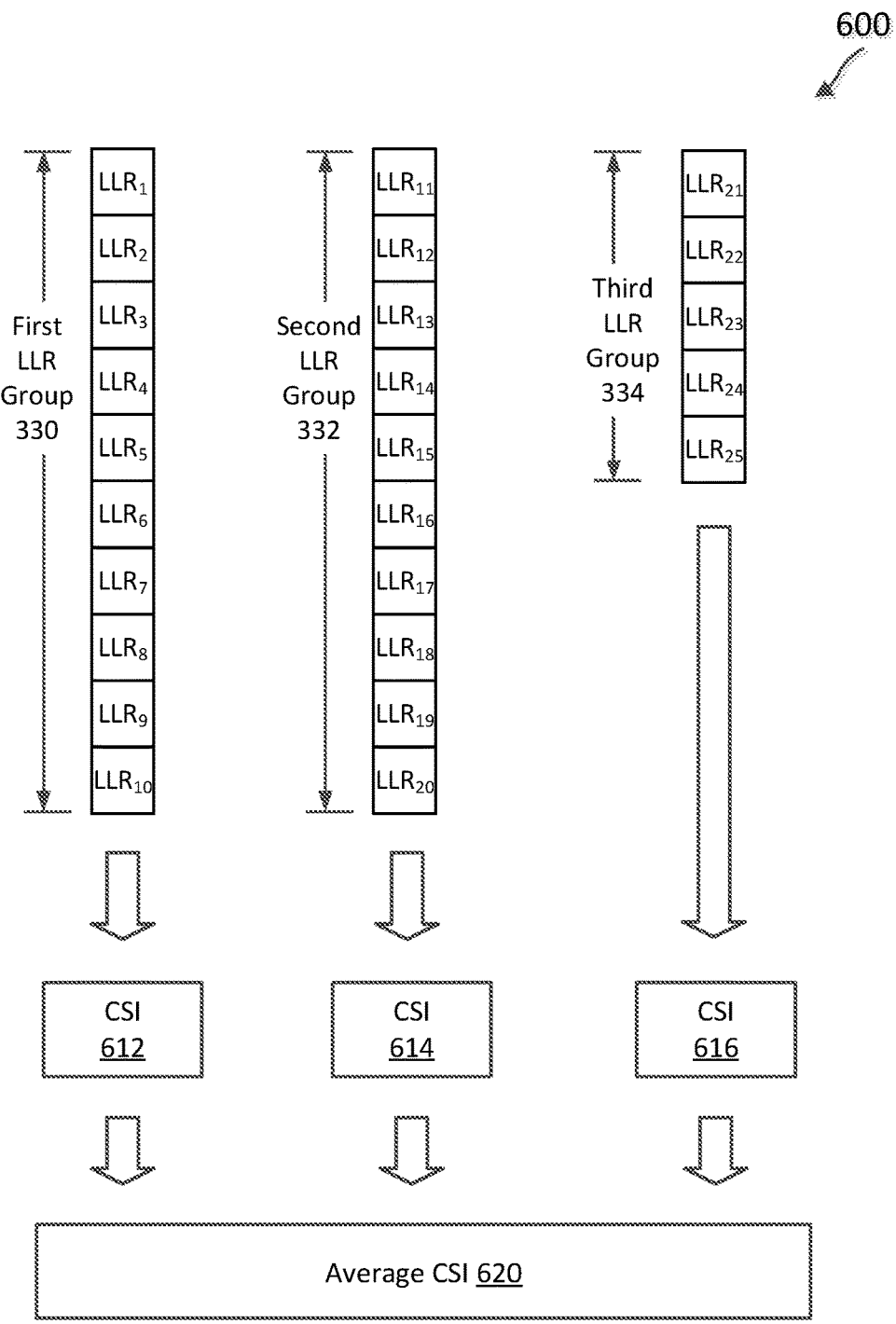
FIG. 6 illustrates a block diagram for reporting channel information according to one or more aspects of the present disclosure.

FIG. 6 illustrates a block diagram 600 for reporting channel information according to one or more aspects of the present disclosure. The first LLR group 330, the second LLR group 332, the third LLR group 334, and the plurality of output LLRs 342 are discussed above in relation to FIG. 3. In FIG. 6, the receiver 315 may compute an average CSI 620 based on averaging across the CSI obtained across the plurality of LLR groups 328 (e.g., the first LLR group 330, the second LLR group 332, and the third LLR group 334) and report the single average CSI 620 to the transmitter 305. For instance, the receiver 315 may compute a CSI for each LLR group 330, 332, and 334. For instance, the receiver 315 may compute a CSI 612 based on the first LLR group 330, a CSI 614 based on the second LLR group 332, and a CSI 616 based on the third LLR group 334. The receiver 315 may compute an average CSI 620 based on the CSI 612, the CSI 614, and the CSI 616. For instance, the receiver 315 may compute a sum of the CSIs 612, 614, and 616 and divide the sum by three. The receiver 315 may transmit, to the transmitter 305, the average CSI 620. In some instances, the CSI may include SINR, and the receiver 315 averages the SINRs and reports the average SINR to the transmitter 305.

The receiver 315 may report at least one of the calculated CSI or a combination of these calculated CSI to the transmitter 305. In some aspects, the receiver 315 can estimate at least one of CQI, SNR, BER, MCS, or rank indicator (RI) from the LLRs and report the CSI including the at least one of the CQI, SNR, BER, MCS, RI.

Figure 7:
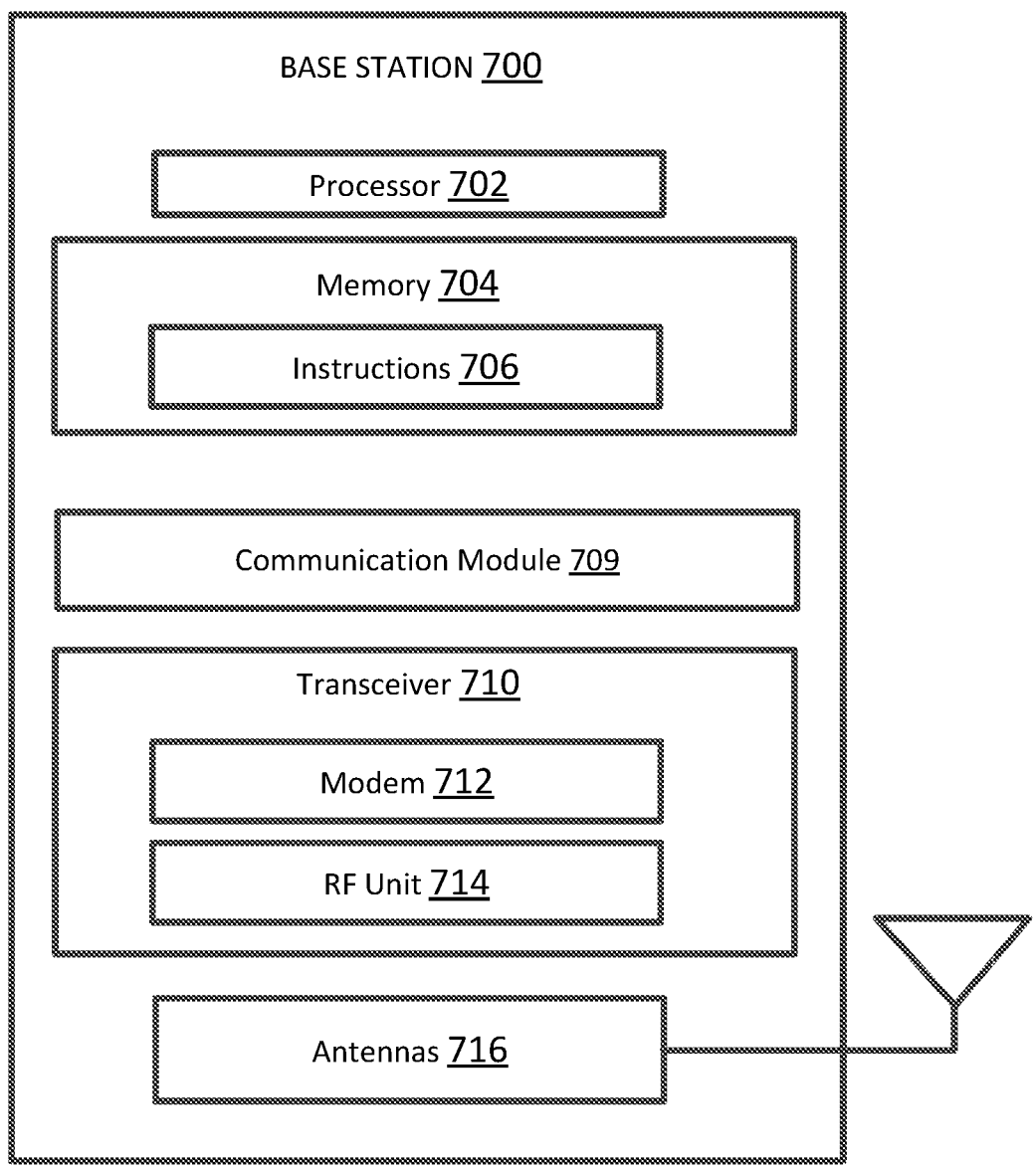
FIG. 7 is a block diagram of a base station (BS) according to one or more aspects of the present disclosure.

FIG. 7 is a block diagram of a BS 700 according to one or more aspects of the present disclosure. The BS 700 may be a BS 105 as discussed in relation to FIGS. 1 and 3 and/or a transmitter 305 as discussed in relation to FIGS. 3-6. As shown, the BS 700 may include a processor 702, a memory 704, a communication module 709, a transceiver 710 including a modem subsystem 712 and a radio frequency (RF) unit 714, and one or more antennas 716. These elements may be in direct or indirect communication with each other, for example via one or more buses.

The processor 702 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some aspects, the memory 704 includes a non-transitory computer-readable medium. The memory 704 may store, or have recorded thereon, instructions 706. The instructions 706 may include instructions that, when executed by the processor 702, cause the processor 702 to perform the operations described herein with reference to the BSs and/or transmitter 305 in connection with aspects of the present disclosure, for example, aspects of FIGS. 1-6. Instructions 706 may also be referred to as program code. The program code may be for causing a wireless communication device to perform these operations, for example by causing one or more processors (such as processor 702) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The communication module 709 may be implemented via hardware, software, or combinations thereof. The communication module 709 may be implemented as a processor, circuit, and/or instructions 706 stored in the memory 704 and executed by the processor 702. In some instances, the communication module 709 can be integrated within the modem subsystem 712. The communication module 709 can be implemented by a combination of software components (e.g., executed by a DSP or a general processor) and hardware components (e.g., logic gates and circuitry) within the modem subsystem 712. The communication module 709 may be used for various aspects of the present disclosure, for example, aspects of FIGS. 1-6.

In some aspects, the communication module 709 may be configured to transmit a communication signal carrying a first number of bits including information bits and redundancy bits. The communication 709 may be configured to transmit the communication signal to a UE 115, a UE 800, or the receiver 315.

As shown, the transceiver 710 may include the modem subsystem 712 and the RF unit 714. The transceiver 710 can be configured to communicate bi-directionally with other devices, such as the UEs 115 and/or another core network element. The modem subsystem 712 may be configured to modulate and/or encode data according to an MCS, e.g., an LDPC coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data (e.g., communication signals carrying a number of bits, etc.) from the modem subsystem 712 (on outbound transmissions) or of transmissions originating from another source such as a UE 115 and/or UE 800. The RF unit 714 may be further configured to perform analog beamforming in conjunction with the digital beamforming. Although shown as integrated together in transceiver 710, the modem subsystem 712 and/or the RF unit 714 may be separate devices that are coupled together at the BS 700 to enable the BS 700 to communicate with other devices.

The RF unit 714 may provide the modulated and/or processed data, e.g. data packets (or, more generally, data messages that may contain one or more data packets and other information), to the antennas 716 for transmission to one or more other devices. This may include, for example, transmission of information to complete attachment to a network and communication with a camped UE 115, 800 or receiver 315 according to one or more aspects of the present disclosure. The antennas 716 may further receive data messages transmitted from other devices and provide the received data messages for processing and/or demodulation at the transceiver 710. The transceiver 710 may provide the demodulated and decoded data (e.g., channel information, etc.) to the communication module 709 for processing. The antennas 716 may include multiple antennas of similar or different designs in order to sustain multiple transmission links.

In an aspect, the transceiver 710 is configured to transmit a communication signal carrying a first number of bits including information bits and redundancy bits by coordinating with the communication module 709. In some aspects, the BS 700 can include multiple transceivers 710 implementing different RATs (e.g., NR and LTE). In an aspect, the BS 700 can include a single transceiver 710 implementing multiple RATs (e.g., NR and LTE). In an aspect, the transceiver 710 can include various components, where different combinations of components can implement different RATs.

Figure 8:
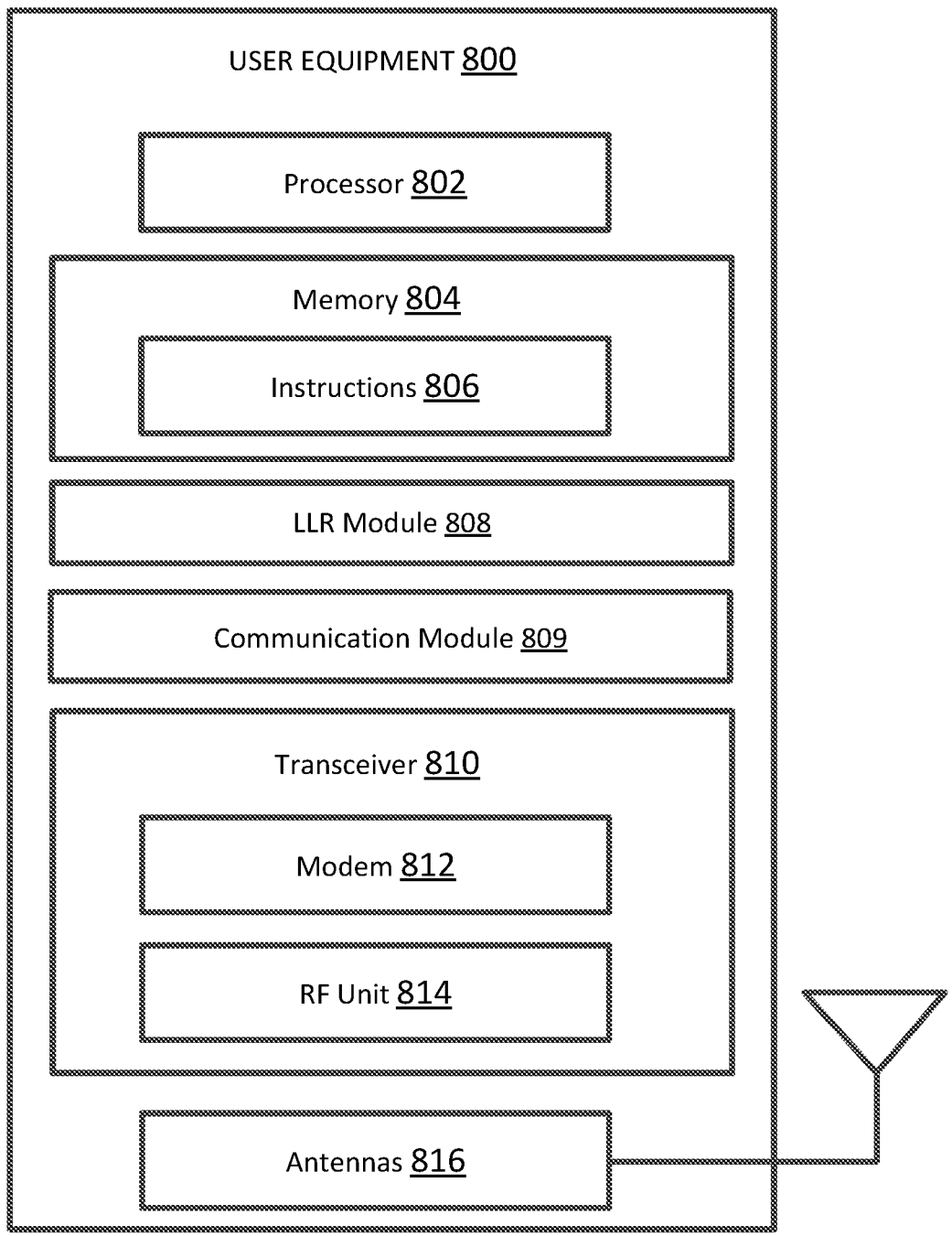
FIG. 8 is a block diagram of a user equipment (UE) according to one or more aspects of the present disclosure.

FIG. 8 is a block diagram of a UE 800 according to one or more aspects of the present disclosure. The UE 800 may be a UE 115 discussed in relation to FIGS. 1 and 2 and/or a receiver 315 discussed in relation to FIGS. 3-6. As shown, the UE 800 may include a processor 802, a memory 804, an LLR module 808, a communication module 809, a transceiver 810 including a modem subsystem 812 and an RF unit 814, and one or more antennas 816. These elements may be in direct or indirect communication with each other, for example via one or more buses.

The processor 802 may have various features as a specific-type processor. For example, these may include a CPU, a DSP, an ASIC, a controller, a FPGA device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 804 may include a non-transitory computer-readable medium. The memory 804 may store instructions 806. The instructions 806 may include instructions that, when executed by the processor 802, cause the processor 802 to perform operations described herein, for example, aspects of FIGS. 1-6 and 9. Instructions 806 may also be referred to as code, which may be interpreted broadly to include any type of computer-readable statement(s) as discussed above with respect to FIG. 7.

The LLR module 808 and/or the communication module 809 may be implemented via hardware, software, or combinations thereof. The LLR module 808 and/or the communication module 809 may be implemented as a processor, circuit, and/or instructions 806 stored in the memory 804 and executed by the processor 802. In some instances, the LLR module 808 and/or the communication module 809 can be integrated within the modem subsystem 812. The LLR module 808 and/or the communication module 809 can be implemented by a combination of software components (e.g., executed by a DSP or a general processor) and hardware components (e.g., logic gates and circuitry) within the modem subsystem 812. The LLR module 808 and/or the communication module 809 may be used for various aspects of the present disclosure, for example, aspects of FIGS. 1-6 and 9.

In some aspects, the communication module 809 may be configured to receive a communication signal including an input signal carrying a first number of bits including information bits and redundancy bits. In some aspects, the LLR module 808 may be configured to compute a plurality of LLRs based on the received communication signal, where at least a first LLR and a second LLR of the plurality of LLRs represent the same first bit in the communication signal. In some aspects, the LLR module 808 may be configured to combine the first LLR and the second LLR to decode the first bit. In some aspects, the communication module 809 may be configured to transmit a report indicating channel information, the channel information being based at least in part on the plurality of LLRs before the combining.

As shown, the transceiver 810 may include the modem subsystem 812 and the RF unit 814. The transceiver 810 can be configured to communicate bi-directionally with other devices, such as the BS 105, the BS 700, and/or the transmitter 305. The modem subsystem 812 may be configured to modulate and/or encode the data from the memory 804 and/or the LLR module 808 and/or the communication module 809 according to an MCS, e.g., a LDPC coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data (e.g., a report indicating channel information, etc.) from the modem subsystem 812 (on outbound transmissions) or of transmissions originating from another source such as a UE 115, the UE 700, or the BS 105. The RF unit 814 may be further configured to perform analog beamforming in conjunction with the digital beamforming. Although shown as integrated together in transceiver 810, the modem subsystem 812 and the RF unit 814 may be separate devices that are coupled together at the UE 800 to enable the UE 800 to communicate with other devices.

The RF unit 814 may provide the modulated and/or processed data, e.g. data packets (or, more generally, data messages that may contain one or more data packets and other information), to the antennas 816 for transmission to one or more other devices. The antennas 816 may further receive data messages transmitted from other devices. The antennas 816 may provide the received data messages for processing and/or demodulation at the transceiver 810. The transceiver 810 may provide the demodulated and decoded data (e.g., a communication signal carrying a number of bits including information bits and redundancy bits, etc.) to the communication module 809 for processing. The antennas 816 may include multiple antennas of similar or different designs in order to sustain multiple transmission links. The RF unit 814 may configure the antennas 816.

In an aspect, the transceiver 810 is configured to receive a communication signal including a number of bits including information bits and redundancy bits by coordinating with the communication module 809. In an aspect, the transceiver 810 is configured to transmit a report indicating channel information by coordinating with the communication module 809

In some aspects, the UE 800 can include multiple transceivers 810 implementing different radio access technologies (RATs) (e.g., NR and LTE). In an aspect, the UE 800 can include a single transceiver 810 implementing multiple RATs (e.g., NR and LTE). In an aspect, the transceiver 810 can include various components, where different combinations of components can implement different RATs.

Figure 9:
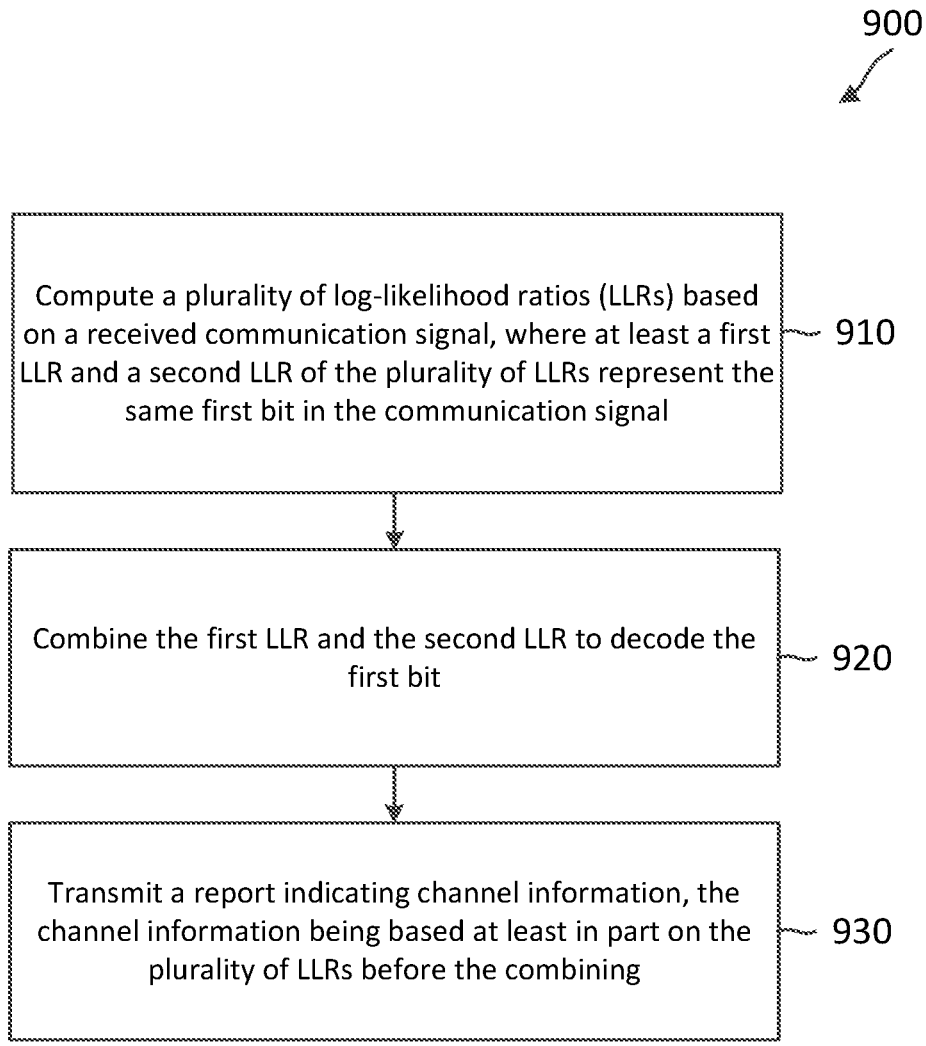
FIG. 9 is a flow diagram of a communication method according to one or more aspects of the present disclosure.

FIG. 9 is a flow diagram of a communication method 900 according to one or more aspects of the present disclosure. Blocks of the method 900 can be executed by a computing device (e.g., a processor, processing circuit, and/or other suitable component) of a wireless communication device or other suitable means for executing the blocks. For example, a wireless communication device, such as the UE 115, the UE 800, and/or the receiver 315 may utilize one or more components, such as the processor 802, the memory 804, the LLR module 808, the communication module 809, the transceiver 810, the modem 812, the RF unit 814, and the one or more antennas 816 to execute the blocks of method 900. The method 900 may employ similar mechanisms as in the block diagrams 300, 400, 500, and/or 600 described above with respect to FIGS. 3, 4, 5, and/or 6, respectively. As illustrated, the method 900 includes a number of enumerated blocks, but aspects of the method 900 may include additional blocks before, after, and in between the enumerated blocks. In some aspects, one or more of the enumerated blocks may be omitted or performed in a different order.

At block 910, the method 900 includes computing a plurality of log-likelihood ratios (LLRs) based on a received communication signal, where at least a first LLR and a second LLR of the plurality of LLRs represent the same first bit in the communication signal. The transmitter 305 or BS 105, 700 may transmit, to the receiver 315 or a UE 115, 800, a communication signal including an input signal carrying a first number of bits including information bits and redundancy bits. The receiver 315 or the UE 115, 800 may receive the communication signal and compute the plurality of LLRs based on the received communication signal. In some aspects, the receiver 315 may compute the plurality of LLRs by computing an LLR for each bit of a first number of bits in the communication signal.

The receiver 315 may calculate a plurality of LLR groups based on the received communication signal. The plurality of LLRs may include a second number of LLR groups, where the second number is a first result of a ceiling operation applied to a quotient of the first number and an encoder buffer size. Additionally or alternatively, a third number of LLR groups of the plurality of LLR groups may include the same number of LLRs as the encoder buffer size, where the third number is a second result of a floor operation applied to the quotient.

In some instances, a first LLR group of the plurality of LLR groups includes the first LLR, and a second LLR group of the plurality of LLR groups includes the second LLR. Each LLR group of the third number of LLR groups may include a group of LLRs corresponding to consecutive bits of the first number of bits, and each LLR group of the plurality of LLR groups may include at least one LLR of the plurality of LLRs representing the same bit in the communication signal. If the quotient has a remainder, then one LLR group of the plurality of LLR groups may include fewer LLRs than the encoder buffer size. If the quotient does not have a remainder, then the second number of LLR groups may be equal to the quotient.

At block 920, the method 900 includes combining the first LLR and the second LLR to decode the first bit. For each LLR of the plurality of LLRs representing the same bit in the communication signal, the receiver 315 or the UE 115, 800 may combine the respective LLRs to obtain a combined LLR and may decode the combined LLR to obtain a corresponding output LLR.

At block 930, the method 900 includes transmitting a report indicating channel information, the channel information being based at least in part on the plurality of LLRs before the combining.

In some aspects, the receiver 315 or the UE 115, 800 may for each LLR group of the plurality of LLR groups, apply a first function to each LLR in the respective LLR group to obtain one or more first binary values. The receiver 315 or the UE 115, 800 may apply the first function to each output LLR corresponding to the respective LLR to obtain one or more second binary values. In some instances, applying the first function may include applying a hard decision to each LLR in each LLR group. The receiver 315 or the UE 115, 800 may apply a second function to the one or more first binary values and the one or more second binary values to obtain a metric. For instance, for each LLR group of the plurality of LLR groups, the receiver 315 or the UE 115, 800 may compare the one or more first binary values associated with the respective LLR group with the one or more second binary values associated with the output LLR corresponding to the respective LLR group to obtain a metric.

In some aspects, the receiver 315 or the UE 115, 800 may, for each LLR group of the plurality of LLR groups, apply a third function to map the respective metric to CSI. The third function may include BER-to-SINR mapping. The SINR may be mapped to CQI for a given target BLER. In some instances, the receiver 315 or the UE 115, 800 may compute a first CSI based on each LLR group of the plurality of LLR groups and compute an average CSI based on the one or more first CSI. Additionally or alternatively, the receiver 315 or the UE 115, 800 may compute a CSI based on combining the plurality of LLRs.

In some aspects, the receiver 315 or the UE 115, 800 may report, in a HARQ-ACK feedback resource in PUCCH to transmitter 305 or to a BS 105, 700, a CSI based on each LLR group of the plurality of LLR groups.

In some aspects, before combining the LLRs, the receiver 315 or the UE 115, 800 may split the sets of LLRs based on buffer size and map the split LLRs into one or more data layers. A split LLR or an uncombined LLR may refer to an LLR that has not been combined with another LLR. The receiver 315 or the UE 115, 800 may then compute or determine a SNR for each data layer. In some aspects, the receiver 315 or the UE 115, 800 may also map the SNR to a spectral efficiency (SPEF). In this regard, the receiver 315 or the UE 115, 800 may determine a SPEF value for each of the one or more data layers. For example, if the receiver 315 or the UE 115, 800 maps the LLRs to two data layers, the receiver 315 or the UE 115, 800 may compute two SPEFs. Further, the receiver 315 or the UE 115, 800 may average the SPEF values across all data layers. In some aspects, the receiver 315 or the UE 115, 800 may further determine a CQI and/or a MCS based on the averaged SPEF. In some aspects, the receiver 315 or the UE 115, 800 may communicate the CQI and/or MCS to the network.

In another aspect, before combining the LLRs, the receiver 315 or the UE 115, 800 may split the sets of LLRs based on buffer size and map the split LLRs into one or more data layers. The receiver 315 or the UE 115, 800 may then compute or determine a SNR for each data layer. The receiver 315 or the UE 115, 800 may average the SNR across layers, and then determine a CQI and/or a MCS based on the averaged SNR. The receiver 315 or the UE 115, 800 may communicate the CQI and/or MCS to the network. In another example, the receiver may determine an averaged SPEF based on the averaged SNR, and compute the CQI and/or MCS based on the averaged SPEF.

EXEMPLARY ASPECTS OF THE DISCLOSURE

The present disclosure further includes the following aspects:

Aspect 1. A method of wireless communication performed by a user equipment (UE), the method comprising: computing a plurality of log-likelihood ratios (LLRs) based on a received communication signal, wherein at least a first LLR and a second LLR of the plurality of LLRs represent the same first bit in the communication signal; combining the first LLR and the second LLR to decode the first bit; and transmitting a report indicating channel information, the channel information being based at least in part on the plurality of LLRs before the combining.

Aspect 2. The method of aspect 1, wherein the communication signal includes an input signal carrying a first number of bits including information bits and redundancy bits.

Aspect 3. The method of any of aspects 1 and 2, wherein computing the plurality of LLRs includes computing an LLR for each bit of a first number of bits in the communication signal.

Aspect 4. The method of aspect 3, comprising: calculating a plurality of LLR groups based on the received communication signal, wherein the plurality of LLRs include a second number of LLR groups, and the second number is a first result of a ceiling operation applied to a quotient of the first number and an encoder buffer size, wherein a third number of LLR groups of the plurality of LLR groups includes the same number of LLRs as the encoder buffer size, and the third number is a second result of a floor operation applied to the quotient.

Aspect 5. The method of aspect 4, wherein a first LLR group of the plurality of LLR groups includes the first LLR, and a second LLR group of the plurality of LLR groups includes the second LLR.

Aspect 6. The method of aspect 4, wherein each LLR group of the third number of LLR groups includes a group of LLRs corresponding to consecutive bits of the first number of bits, and each LLR group of the plurality of LLR groups includes at least one LLR of the plurality of LLRs representing the same bit in the communication signal.

Aspect 7. The method of any of aspects 4-6, wherein the quotient has a remainder, and one LLR group of the plurality of LLR groups includes fewer LLRs than the encoder buffer size.

Aspect 8. The method of any of aspects 4-6, wherein the quotient does not have a remainder, and the second number of LLR groups is equal to the quotient.

Aspect 9. The method of any of aspects 1-8, comprising for each LLR of the plurality of LLRs representing the same bit in the communication signal: combining the respective LLRs to obtain a combined LLR; and decoding the combined LLR to obtain a corresponding output LLR.

Aspect 10. The method of aspect 9, comprising: calculating a plurality of LLR groups based on the received communication signal including a first number of bits, wherein computing the plurality of LLRs includes computing an LLR for each bit of the first number of bits, wherein the plurality of LLRs include a second number of LLR groups, and the second number is a first result of a ceiling operation applied to a quotient of the first number and an encoder buffer size, wherein a third number of LLR groups of the plurality of LLR groups includes the same number of LLRs as the encoder buffer size, and the third number is a second result of a floor operation applied to the quotient.

Aspect 11. The method of aspect 10, comprising: for each LLR group of the plurality of LLR groups, applying a first function to each LLR in the respective LLR group to obtain one or more first binary values; and applying the first function to each output LLR corresponding to the respective LLR to obtain one or more second binary values.

Aspect 12. The method of aspect 11, wherein applying the first function includes applying a hard decision to each LLR in each LLR group.

Aspect 13. The method of any of aspects 11-12, comprising: applying a second function to the one or more first binary values and the one or more second binary values to obtain a metric.

Aspect 14. The method of any of aspects 11-13, comprising: for each LLR group of the plurality of LLR groups, comparing the one or more first binary values associated with the respective LLR group with the one or more second binary values associated with the output LLR corresponding to the respective LLR group to obtain a metric.

Aspect 15. The method of aspect 14, comprising: reporting, in a hybrid automatic repeat request-acknowledgement (HARQ-ACK) feedback resource in physical uplink control channel (PUCCH) to a base station (BS), a CSI based on each LLR group of the plurality of LLR groups.

Aspect 16. The method of any of aspects 14-15, comprising: for each LLR group of the plurality of LLR groups, applying a third function to map the respective metric to channel state information (CSI).

Aspect 17. The method of aspect 16, wherein the third function is bit error rate (BER)-to-signal-to-interference-plus-noise ratio (SINR) mapping.

Aspect 18. The method of aspect 17, wherein the SINR is mapped to channel quality information (CQI) for a given target block error rate (BLER).

Aspect 19. The method of aspect 18, comprising: for each LLR group of the plurality of LLR groups, computing a first CSI based on the respective LLR group; and computing an average CSI based on the one or more first CSI.

Aspect 20. The method of aspect 18, comprising: computing a CSI based on combining the plurality of LLRs.

Aspect 21. A user equipment (UE), comprising: a memory; and at least one processor operatively coupled to the memory and configured to: compute a plurality of log-likelihood ratios (LLRs) based on a received communication signal, wherein at least a first LLR and a second LLR of the plurality of LLRs represent the same first bit in the communication signal; combine the first LLR and the second LLR to decode the first bit; and transmit a report indicating channel information, the channel information being based at least in part on the plurality of LLRs before the combining.

Aspect 22. The UE of aspect 21, wherein the at least one processor is configured to for each LLR of the plurality of LLRs representing the same bit in the communication signal: combine the respective LLRs to obtain a combined LLR; and decode the combined LLR to obtain a corresponding output LLR.

Aspect 23. The UE of aspect 21, wherein the at least one processor is configured to: calculate a plurality of LLR groups based on the received communication signal including a first number of bits; and compute an LLR for each bit of the first number of bits, wherein the plurality of LLRs include a second number of LLR groups, and the second number is a first result of a ceiling operation applied to a quotient of the first number and an encoder buffer size, wherein a third number of LLR groups of the plurality of LLR groups includes the same number of LLRs as the encoder buffer size, and the third number is a second result of a floor operation applied to the quotient.

Aspect 24. The UE of aspect 23, wherein the at least one processor is configured to: for each LLR group of the plurality of LLR groups, apply a first function to each LLR in the respective LLR group to obtain one or more first binary values; apply the first function to each output LLR corresponding to the respective LLR to obtain one or more second binary values; apply a second function to the one or more first binary values and the one or more second binary value to obtain a metric; and for each LLR group of the plurality of LLR groups, apply a third function to an output of the second function to map the respective metric to channel state information (CSI), wherein the channel information includes the CSI.

Aspect 25. A non-transitory computer-readable medium (CRM) having program code recorded thereon, the program code comprising: code for causing a user equipment (UE) to compute a plurality of log-likelihood ratios (LLRs) based on a received communication signal, wherein at least a first LLR and a second LLR of the plurality of LLRs represent the same first bit in the communication signal; code for causing the UE to combine the first LLR and the second LLR to decode the first bit; and code for causing the UE to transmit a report indicating channel information, wherein the channel information is based at least in part on the plurality of LLRs before the combining.

Aspect 26. The CRM of aspect 25, wherein the program code further includes: code for causing the UE to, for each LLR of the plurality of LLRs representing the same bit in the communication signal, combine the respective LLRs to obtain a combined LLR; and code for causing the UE to decode the combined LLR to obtain a corresponding output LLR.

Aspect 27. The CRM of aspect 25, wherein the program code further includes: code for causing the UE to calculate a plurality of LLR groups based on the received communication signal including a first number of bits; and code for causing the UE to compute an LLR for each bit of the first number of bits, wherein the plurality of LLRs include a second number of LLR groups, and the second number is a first result of a ceiling operation applied to a quotient of the first number and an encoder buffer size, wherein a third number of LLR groups of the plurality of LLR groups includes the same number of LLRs as the encoder buffer size, and the third number is a second result of a floor operation applied to the quotient.

Aspect 28. The CRM of aspect 27, wherein the program code further includes: code for causing the UE to, for each LLR group of the plurality of LLR groups, apply a first function to each LLR in the respective LLR group to obtain one or more first binary values; code for causing the UE to apply the first function to each output LLR corresponding to the respective LLR to obtain one or more second binary values; code for causing the UE to apply a second function to the one or more first binary values and the one or more second binary value to obtain a metric; and code for causing the UE to, for each LLR group of the plurality of LLR groups, apply a third function to an output of the second function to map the respective metric to channel state information (CSI), wherein the channel information includes the CSI.

Aspect 29. A user equipment (UE), comprising: means for computing a plurality of log-likelihood ratios (LLRs) based on a received communication signal, wherein at least a first LLR and a second LLR of the plurality of LLRs represent the same first bit in the communication signal; means for combining the first LLR and the second LLR to decode the first bit; and means for transmitting a report indicating channel information, the channel information being based at least in part on the plurality of LLRs before the combining.

Aspect 30. The UE of aspect 29, further comprising: means for combining the respective LLRs to obtain a combined LLR; means for decoding the combined LLR to obtain a corresponding output LLR; and means for calculating a plurality of LLR groups based on the received communication signal including a first number of bits, wherein the means for computing the plurality of LLRs includes means for computing an LLR for each bit of the first number of bits, wherein the plurality of LLRs include a second number of LLR groups, and the second number is a first result of a ceiling operation applied to a quotient of the first number and an encoder buffer size, wherein a third number of LLR groups of the plurality of LLR groups includes the same number of LLRs as the encoder buffer size, and the third number is a second result of a floor operation applied to the quotient.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
   computing a plurality of log-likelihood ratios (LLRs) based on a received communication signal, wherein at least a first LLR and a second LLR of the plurality of LLRs represent the same first bit in the communication signal;
   combining the first LLR and the second LLR to decode the first bit; and
   transmitting a report indicating channel information, the channel information being based at least in part on the first LLR and the second LLR being uncombined.

2. The method of claim 1, wherein the communication signal includes an input signal carrying a first number of bits including information bits and redundancy bits.

3. The method of claim 1, wherein computing the plurality of LLRs includes computing an LLR for each bit of a first number of bits in the communication signal.

4. The method of claim 3, comprising:
   calculating a plurality of LLR groups based on the received communication signal, wherein the plurality of LLRs include a second number of LLR groups, and the second number is a first result of a ceiling operation applied to a quotient of the first number and an encoder buffer size, wherein a third number of LLR groups of the plurality of LLR groups includes the same number of LLRs as the encoder buffer size, and the third number is a second result of a floor operation applied to the quotient.

5. The method of claim 4, wherein a first LLR group of the plurality of LLR groups includes the first LLR, and a second LLR group of the plurality of LLR groups includes the second LLR.

6. The method of claim 4, wherein each LLR group of the third number of LLR groups includes a group of LLRs corresponding to consecutive bits of the first number of bits, and each LLR group of the plurality of LLR groups includes at least one LLR of the plurality of LLRs representing the same bit in the communication signal.

7. The method of claim 4, wherein the quotient has a remainder, and one LLR group of the plurality of LLR groups includes fewer LLRs than the encoder buffer size.

8. The method of claim 4, wherein the quotient does not have a remainder, and the second number of LLR groups is equal to the quotient.

9. The method of claim 1, comprising for each LLR of the plurality of LLRs representing the same bit in the communication signal:
   combining the respective LLRs to obtain a combined LLR; and
   decoding the combined LLR to obtain a corresponding output LLR.

10. The method of claim 9, comprising:
    calculating a plurality of LLR groups based on the received communication signal including a first number of bits, wherein computing the plurality of LLRs includes computing an LLR for each bit of the first number of bits, wherein the plurality of LLRs include a second number of LLR groups, and the second number is a first result of a ceiling operation applied to a quotient of the first number and an encoder buffer size, wherein a third number of LLR groups of the plurality of LLR groups includes the same number of LLRs as the encoder buffer size, and the third number is a second result of a floor operation applied to the quotient.

11. The method of claim 10, comprising:
    for each LLR group of the plurality of LLR groups, applying a first function to each LLR in the respective LLR group to obtain one or more first binary values; and
    applying the first function to each output LLR corresponding to the respective LLR to obtain one or more second binary values.

12. The method of claim 11, wherein applying the first function includes applying a hard decision to each LLR in each LLR group.

13. The method of claim 11, comprising:
    applying a second function to the one or more first binary values and the one or more second binary values to obtain a metric.

14. The method of claim 11, comprising:
    for each LLR group of the plurality of LLR groups, comparing the one or more first binary values associated with the respective LLR group with the one or more second binary values associated with the output LLR corresponding to the respective LLR group to obtain a metric.

15. The method of claim 14, comprising:
    reporting, in a hybrid automatic repeat request-acknowledgement (HARQ-ACK) feedback resource in physical uplink control channel (PUCCH) to a base station (BS), a CSI based on each LLR group of the plurality of LLR groups.

16. The method of claim 14, comprising:
    for each LLR group of the plurality of LLR groups, applying a third function to map the respective metric to channel state information (CSI).

17. The method of claim 16, wherein the third function is bit error rate (BER)-to-signal-to-interference-plus-noise ratio (SINR) mapping.

18. The method of claim 17, wherein the SINR is mapped to channel quality information (CQI) for a given target block error rate (BLER).

19. The method of claim 18, comprising:
    for each LLR group of the plurality of LLR groups, computing a first CSI based on the respective LLR group; and
    computing an average CSI based on the one or more first CSI.

20. The method of claim 18, comprising:
    computing a CSI based on combining the plurality of LLRs.

21. A user equipment (UE), comprising:
    a memory; and
    at least one processor operatively coupled to the memory and configured to:
    compute a plurality of log-likelihood ratios (LLRs) based on a received communication signal, wherein at least a first LLR and a second LLR of the plurality of LLRs represent the same first bit in the communication signal;

combine the first LLR and the second LLR to decode the first bit; and transmit a report indicating channel information, the channel information being based at least in part on the first LLR and the second LLR being uncombined.

22. The UE of claim 21, wherein the at least one processor is configured to for each LLR of the plurality of LLRs representing the same bit in the communication signal:

combine the respective LLRs to obtain a combined LLR; and decode the combined LLR to obtain a corresponding output LLR.

23. The UE of claim 21, wherein the at least one processor is configured to:

calculate a plurality of LLR groups based on the received communication signal including a first number of bits; and compute an LLR for each bit of the first number of bits, wherein the plurality of LLRs include a second number of LLR groups, and the second number is a first result of a ceiling operation applied to a quotient of the first number and an encoder buffer size, wherein a third number of LLR groups of the plurality of LLR groups includes the same number of LLRs as the encoder buffer size, and the third number is a second result of a floor operation applied to the quotient.

24. The UE of claim 23, wherein the at least one processor is configured to:

for each LLR group of the plurality of LLR groups, apply a first function to each LLR in the respective LLR group to obtain one or more first binary values;

apply the first function to each output LLR corresponding to the respective LLR to obtain one or more second binary values;

apply a second function to the one or more first binary values and the one or more second binary value to obtain a metric; and for each LLR group of the plurality of LLR groups, apply a third function to an output of the second function to map the respective metric to channel state information (CSI), wherein the channel information includes the CSI.

25. A non-transitory computer-readable medium (CRM) having program code recorded thereon, the program code comprising:

code for causing a user equipment (UE) to compute a plurality of log-likelihood ratios (LLRs) based on a received communication signal, wherein at least a first LLR and a second LLR of the plurality of LLRs represent the same first bit in the communication signal;

code for causing the UE to combine the first LLR and the second LLR to decode the first bit; and code for causing the UE to transmit a report indicating channel information, wherein the channel information is based at least in part on the first LLR and the second LLR being uncombined.

26. The CRM of claim 25, wherein the program code further includes:

code for causing the UE to, for each LLR of the plurality of LLRs representing the same bit in the communication signal, combine the respective LLRs to obtain a combined LLR; and code for causing the UE to decode the combined LLR to obtain a corresponding output LLR.

27. The CRM of claim 25, wherein the program code further includes:

code for causing the UE to calculate a plurality of LLR groups based on the received communication signal including a first number of bits; and code for causing the UE to compute an LLR for each bit of the first number of bits, wherein the plurality of LLRs include a second number of LLR groups, and the second number is a first result of a ceiling operation applied to a quotient of the first number and an encoder buffer size, wherein a third number of LLR groups of the plurality of LLR groups includes the same number of LLRs as the encoder buffer size, and the third number is a second result of a floor operation applied to the quotient.

28. The CRM of claim 27, wherein the program code further includes:

code for causing the UE to, for each LLR group of the plurality of LLR groups, apply a first function to each LLR in the respective LLR group to obtain one or more first binary values;

code for causing the UE to apply the first function to each output LLR corresponding to the respective LLR to obtain one or more second binary values;

code for causing the UE to apply a second function to the one or more first binary values and the one or more second binary value to obtain a metric; and code for causing the UE to, for each LLR group of the plurality of LLR groups, apply a third function to an output of the second function to map the respective metric to channel state information (CSI), wherein the channel information includes the CSI.

29. A user equipment (UE), comprising:

means for computing a plurality of log-likelihood ratios (LLRs) based on a received communication signal, wherein at least a first LLR and a second LLR of the plurality of LLRs represent the same first bit in the communication signal;

means for combining the first LLR and the second LLR to decode the first bit; and means for transmitting a report indicating channel information, the channel information being based at least in part on the first LLR and the second LLR being uncombined.

30. The UE of claim 29, further comprising:

means for combining the respective LLRs to obtain a combined LLR;

means for decoding the combined LLR to obtain a corresponding output LLR; and means for calculating a plurality of LLR groups based on the received communication signal including a first number of bits, wherein the means for computing the plurality of LLRs includes means for computing an LLR for each bit of the first number of bits, wherein the plurality of LLRs include a second number of LLR groups, and the second number is a first result of a ceiling operation applied to a quotient of the first number and an encoder buffer size, wherein a third number of LLR groups of the plurality of LLR groups includes the same number of LLRs as the encoder buffer size, and the third number is a second result of a floor operation applied to the quotient.

* * * * *